United States Patent
Kajita et al.

(10) Patent No.: US 12,034,117 B2
(45) Date of Patent: Jul. 9, 2024

(54) LIQUID COMPOSITION, STORAGE CONTAINER, AND APPARATUS AND METHOD FOR PRODUCING SOLID ELECTROLYTE LAYER OR ELECTRODE MIXTURE LAYER

(71) Applicants: Tomomasa Kajita, Kanagawa (JP); Hiromichi Kuriyama, Kanagawa (JP); Satoshi Nakajima, Tokyo (JP); Yoshio Itoh, Kanagawa (JP); Shigeo Takeuchi, Kanagawa (JP); Yuji Sone, Kanagawa (JP); Aya Utsuki, Tokyo (JP); Kayato Ohya, Kanagawa (JP)

(72) Inventors: Tomomasa Kajita, Kanagawa (JP); Hiromichi Kuriyama, Kanagawa (JP); Satoshi Nakajima, Tokyo (JP); Yoshio Itoh, Kanagawa (JP); Shigeo Takeuchi, Kanagawa (JP); Yuji Sone, Kanagawa (JP); Aya Utsuki, Tokyo (JP); Kayato Ohya, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 18/053,492

(22) Filed: Nov. 8, 2022

(65) Prior Publication Data
US 2023/0198010 A1 Jun. 22, 2023

(30) Foreign Application Priority Data
Dec. 16, 2021 (JP) .................................. 2021-204147
Mar. 17, 2022 (JP) .................................. 2022-042397

(51) Int. Cl.
H01M 10/0562 (2010.01)
B41J 2/175 (2006.01)
(Continued)

(52) U.S. Cl.
CPC ...... *H01M 10/0562* (2013.01); *B41J 2/17503* (2013.01); *H01M 4/0419* (2013.01);
(Continued)

(58) Field of Classification Search
CPC .. H01M 10/0562; H01M 4/0419; H01M 4/62; H01M 2300/0068; H01M 4/139;
(Continued)

(56) References Cited

U.S. PATENT DOCUMENTS 10,062,923 B2 * 8/2018 Mimura ................. C08F 265/06
2014/0004257 A1 1/2014 Kubo et al.
(Continued)

FOREIGN PATENT DOCUMENTS

JP 2009-211950 9/2009
JP 2012-212652 11/2012
(Continued)

OTHER PUBLICATIONS

Extended European Search Report dated May 17, 2023, in European Patent Application No. 22205379.5, 9 pages.
(Continued)

*Primary Examiner* — Andrew J. Oyer
(74) *Attorney, Agent, or Firm* — Grüneberg and Myers PLLC

(57) ABSTRACT

A liquid composition containing a solvent, an inorganic solid electrolyte, and a dispersant is provided. The dispersant is soluble in the solvent. A 10% volume fraction-component's particle diameter ($D_{10}$), a 50% volume fraction-component's particle diameter ($D_{50}$), a 90% volume fraction-component's particle diameter ($D_{90}$), and a mode diameter ($D_m$) of solids contained in the liquid composition satisfy $D_{90}/D_{10} > 10$, $D_{50} < 1$ μm, and $D_m < 2$ μm, where $D_{10}$, $D_{50}$, $D_{90}$, and $D_m$ are measured by a laser diffraction method.

14 Claims, 3 Drawing Sheets

(51) Int. Cl.
  *C09D 11/36* (2014.01)
  *C09D 11/38* (2014.01)
  *C09D 11/52* (2014.01)
  *H01M 4/04* (2006.01)
  *H01M 4/62* (2006.01)

(52) U.S. Cl.
  CPC .............. *H01M 4/62* (2013.01); *C09D 11/36* (2013.01); *C09D 11/38* (2013.01); *C09D 11/52* (2013.01); *H01M 2300/0068* (2013.01)

(58) Field of Classification Search
  CPC ............. H01M 10/058; H01M 10/052; H01M 10/0525; B41J 2/17503; C09D 11/36; C09D 11/38; C09D 11/52; Y02E 60/10
  See application file for complete search history.

(56) References Cited

U.S. PATENT DOCUMENTS

| | | |
|---|---|---|
| 2017/0214081 A1 | 7/2017 | Tsuno et al. |
| 2018/0277909 A1 | 9/2018 | Harada et al. |
| 2019/0051465 A1 | 2/2019 | Araki et al. |
| 2019/0190027 A1 | 6/2019 | Takeshita et al. |
| 2020/0212480 A1 | 7/2020 | Mimura et al. |
| 2020/0255963 A1* | 8/2020 | Hall ........................ C25B 1/04 |
| 2021/0159480 A1 | 5/2021 | Nakajima et al. |
| 2021/0234171 A1 | 7/2021 | Sagisaka et al. |
| 2022/0302454 A1 | 9/2022 | Nakajima et al. |

FOREIGN PATENT DOCUMENTS

| | | |
|---|---|---|
| JP | 2013-157084 | 8/2013 |
| WO | 2016/013224 | 1/2016 |
| WO | 2019/054455 | 3/2019 |

OTHER PUBLICATIONS

Rahul et al., "Inkjet Printing of Yttria Stabilized Zirconia Nano Particles on Metal Substrates", International Journal of Precision Engineering and Manufacturing, vol. 16, No. 12, Nov. 2015, pp. 2553-2561.

Environment Agency, Environmental Health Department, Office of Health Studies, Studies into Physicochemical Characterization of Chemical Substances, Japan Environment Association, 1986.

Delseroth H.-J., S.-T. Kong, H. Eckert, J. Vannahme, C. Relner, T. Zaiss and Schlosser, Angew. Chem., International Edition 47, 2008, pp. 755-758.

Rosero-Navarro Nataly Carolina, et al., Journal of Power Sources 396, 2018, pp. 33-40.

Kwon Ohmin, Masaaki Hirayama, Kota Suzuki, Yuki Kato, Toshiya Saito, Masao Yonemura, Takashi Kamiyama and Ryoji Kanno, J. Mater. Chem. A, 3, 2015, pp. 438-446.

* cited by examiner

LIQUID COMPOSITION, STORAGE CONTAINER, AND APPARATUS AND METHOD FOR PRODUCING SOLID ELECTROLYTE LAYER OR ELECTRODE MIXTURE LAYER

CROSS-REFERENCE TO RELATED APPLICATION

The present application claims priority under 35 U.S.C. § 119 to Japanese Patent Application No. 2021-204147 filed Dec. 16, 2021, and Japanese patent application No. 2022-042397 filed Mar. 17, 2022. The contents of which are incorporated herein by reference in their entirety.

BACKGROUND OF THE INVENTION

1. Field of the Invention

The disclosures herein generally relate to a liquid composition, a storage container, and an apparatus and method for producing a solid electrolyte layer or an electrode mixture layer.

2. Description of the Related Art

Electrochemical elements such as lithium-ion secondary batteries, lithium-ion capacitors, electric double layer capacitors, and redox capacitors are mounted on, for example, electronic appliances and electric vehicles and are widely used. In particular, demand for lithium-ion secondary batteries for vehicles is expected to expand because of the recent years' needs to reduce environmental impacts. In this context, greater improvement in safety and energy density of lithium-ion secondary batteries is required, and active efforts are being made to bring into practical use all-solid-state batteries in which existing electrolytic solutions are replaced with solid electrolytes.

A requisite property of solid electrolyte layers of all-solid-state batteries is a high Li ion conductivity.

For example, a technique using solid electrolyte particles having a large average particle diameter and solid electrolyte particles having a small average particle diameter is proposed as a technique aiming to provide an all-solid-state battery including a solid electrolyte layer having a low ion conduction resistance and a high packing percentage (for example, see Japanese Unexamined Patent Application Publication No. 2013-157084).

The production processes for solid electrolyte layers of all-solid-state batteries are roughly classified into dry processes and wet processes. In dry processes, dry solid electrolyte powder particles are deployed in a sheet shape, and pressed and sintered, to obtain a sheet-shaped solid electrolyte layer. In wet processes, a coating process using a liquid composition, obtained by mixing a solid electrolyte in a solvent, is used to form the electrolyte layer. In terms of productivity, wet processes are preferred.

Moreover, among wet processes, a coating process by inkjet printing that can exploit precise coating control and contribute to improvement in latitude of solid-state battery shapes and to streamlining is very effective in terms of future needs for latitude of battery shapes and highly efficient production.

From the viewpoint of improving production efficiency when forming solid electrolyte layers, one may consider preparing a slurry that contains a solid electrolyte at a high solid concentration.

For example, a technique using a specific solvent is proposed as a technique aiming for moderating decrease in the ion conductivity of a solid electrolyte (for example, see International Publication No. WO 2016/013224). The proposed technique sets forth that it is also possible to obtain a composition excellent in slurry retainability and a slurry coating property by using the solvent.

A solid electrolyte composition that contains: a polymer containing a constituent derived from a macromonomer satisfying a predetermined condition; and a dispersion medium is proposed as a technique that exploits an excellent dispersibility for, for example, improvement of the production efficiency of all-solid-state secondary batteries (for example, see International Publication No. WO 2019/054455).

A technique using solid electrolyte particles having a predetermined particle diameter is proposed as a technique aiming to provide, for example, a solid electrolyte that can retain a slurry state for a certain time duration when it is mixed in a liquid (for example, see Japanese Unexamined Patent Application Publication No. 2009-211950).

Efforts are also being made to inhibit emission of hydrogen sulfide and generation of, for example, sulfur oxides in the production process, by using, for example, hydrocarbon-based solvents having a low polarity (for example, see Japanese Unexamined Patent Application Publication No. 2012-212652).

SUMMARY OF THE INVENTION

In one embodiment, a liquid composition contains a solvent, an inorganic solid electrolyte, and a dispersant. The dispersant is soluble in the solvent. A 10% volume fraction-component's particle diameter ($D_{10}$), a 50% volume fraction-component's particle diameter ($D_{50}$), a 90% volume fraction-component's particle diameter ($D_{90}$), and a mode diameter ($D_m$) of solids contained in the liquid composition satisfy Formulae (1) to (3) below, where $D_{10}$, $D_{50}$, $D_{90}$, and $D_m$ are measured by a laser diffraction method.

$$D_{90}/D_{10} > 10 \qquad \text{Formula (1)}$$

$$D_{50} < 1\ \mu m \qquad \text{Formula (2)}$$

$$D_m < 2\ \mu m \qquad \text{Formula (3)}$$

DESCRIPTION OF THE PREFERRED EMBODIMENTS

Figure 1:
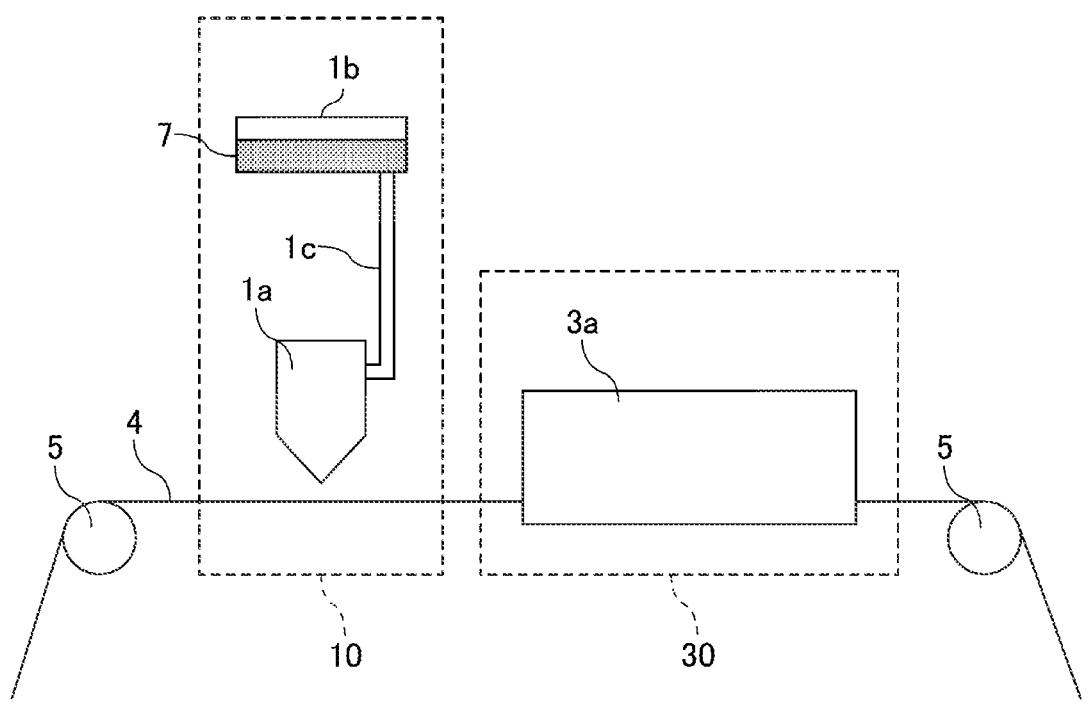
FIG. 1 is an exemplary view illustrating an example of an apparatus configured to produce a solid electrolyte layer or an electrode mixture layer for realizing a method for producing a solid electrolyte layer or an electrode mixture layer of the present disclosure.

In the following, embodiments of the present invention will be described with reference to the accompanying drawings.

(Liquid Composition)

An embodiment of a liquid composition of the present disclosure is a liquid composition that contains a solvent, an inorganic solid electrolyte, and a dispersant, and further contains other components as needed, wherein the dispersant is soluble in the solvent, and a 10% volume fraction-component's particle diameter ($D_{10}$), a 50% volume fraction-component's particle diameter ($D_{50}$), a 90% volume fraction-component's particle diameter ($D_{90}$), and a mode diameter ($D_m$) of solids contained in the liquid composition satisfy Formulae (1) to (3) below, where $D_{10}$, $D_{50}$, $D_{90}$, and $D_m$ are measured by a laser diffraction method (hereinafter, this embodiment may be referred to as "the first embodiment"). Another embodiment of the liquid composition of the present disclosure is a liquid composition that is for being discharged using an inkjet head, contains a solvent, an inorganic solid electrolyte, and a dispersant, and further contains other components as needed, wherein the dispersant is soluble in the solvent, and a 10% volume fraction-component's particle diameter ($D_{10}$), a 50% volume fraction-component's particle diameter ($D_{50}$), a 90% volume fraction-component's particle diameter ($D_{90}$), and a mode diameter ($D_m$) of solids contained in the liquid composition satisfy Formulae (1) to (3) below, where $D_{10}$, $D_{50}$, $D_{90}$, and $D_m$ are measured by a laser diffraction method (hereinafter, this embodiment may be referred to as "the second embodiment").

$$D_{90}/D_{10} > 10 \qquad \text{Formula (1)}$$

$$D_{50} < 1 \ \mu m \qquad \text{Formula (2)}$$

$$D_m < 2 \ \mu m \qquad \text{Formula (3)}$$

According to the present disclosure, it is an object to provide a liquid composition that has a good inkjet dischargeability and with which a solid electrolyte layer having a good ion conductivity can be obtained.

According to the present disclosure, it is possible to provide a liquid composition that has a good inkjet dischargeability and with which a solid electrolyte layer having a good ion conductivity can be obtained.

As described above, a requisite property of solid electrolyte layers of all-solid-state batteries is a high Li ion conductivity.

In terms of productivity, a wet coating process using, for example, a die coater or a comma coater is preferable as the method for producing a solid electrolyte layer. In terms of on-demand performance, it is considered preferable to form a solid electrolyte by inkjet discharging using a liquid discharging apparatus.

However, it has been extremely difficult to obtain a liquid composition that can keep a good inkjet dischargeability and with which a solid electrolyte layer having a good ion conductivity can be obtained. For example, use of solid electrolyte material particles having a large particle diameter in a liquid composition is advantageous in that the grain boundary resistance can be moderated and the ion conductivity can be maintained in a good condition, but disadvantageous in that inkjet dischargeability is poor. On the other hand, use of solid electrolyte material particles having a small particle diameter in a liquid composition enables a stable inkjet discharging, but brings about a high grain boundary resistance due to the presence of many grain boundaries and a low ion conductivity.

The present inventors have found that a liquid composition containing a solvent, an inorganic solid electrolyte (hereinafter, may be referred to as an "ion conductive material"), and a dispersant can qualify as a liquid composition that has a good inkjet dischargeability and with which a solid electrolyte layer having a good ion conductivity can be obtained, when the dispersant is soluble in the solvent, and a 10% volume fraction-component's particle diameter ($D_{10}$), a 50% volume fraction-component's particle diameter ($D_{50}$), a 90% volume fraction-component's particle diameter ($D_{90}$), and a mode diameter ($D_m$) of solids contained in the liquid composition satisfy Formulae (1) to (3) below, where $D_{10}$, $D_{50}$, $D_{90}$, and $D_m$ are measured by a laser diffraction method.

$$D_{90}/D_{10} > 10 \qquad \text{Formula (1)}$$

$$D_{50} < 1 \ \mu m \qquad \text{Formula (2)}$$

$$D_m < 2 \ \mu m \qquad \text{Formula (3)}$$

This is explained by the following reason.

An actual powder particle-packed state obtained when a liquid composition is dried is considered a random particle-packed state. For the ideal closest packed state in which the gaps between large particles are packed with small particles, it is necessary to pack the gaps between large particles with small particles. It is difficult to realize this state by the random packing, which would rather make drawbacks of any places where large particles are absent appear as side effects and invite decrease in the ion conductivity as a result. In order to increase the packing percentage, pressing at an extremely high pressure of 100 MPa or higher has been necessary.

In this circumstance, it has been found that the packing percentage in a solid electrolyte layer formed of a dry powder obtained from a liquid composition is actually improved and a good effect in terms of ion conductivity is obtained when particles continuously and widely varying in particle diameter are present and many small particles are present conversely to the ideal packed state.

Yet another embodiment of the liquid composition of the present disclosure is a liquid composition that contains a solvent, an inorganic solid electrolyte, and a dispersant and further contains other components as needed, wherein the solvent is at least one selected from the group consisting of (I) aliphatic hydrocarbons, (II) monoethers, and (III) branched esters, wherein (I) aliphatic hydrocarbons, (II) monoethers, and (III) branched esters have a vapor pressure of 0.1 hPa or higher and 1.0 hPa or lower at 25° C. (hereinafter, this embodiment may be referred to as "the third embodiment"). Still yet another embodiment of the liquid composition of the present disclosure is a liquid composition that is discharged using an inkjet head, contains a solvent, an inorganic solid electrolyte, and a dispersant, and further contains other components as needed, wherein the solvent is at least one selected form the group consisting of (I) aliphatic hydrocarbons, (II) monoethers, and (III) branched esters, wherein (I) aliphatic hydrocarbons, (II) monoethers, and (III) branched esters have a vapor pressure of 0.1 hPa or higher and 1.0 hPa or lower at 25° C. (hereinafter, this embodiment may be referred to as "the fourth embodiment").

According to the present disclosure, it is an object to provide a liquid composition that can inhibit emission of hydrogen sulfide and improve the dispersibility of an inorganic solid electrolyte even when it contains the inorganic solid electrolyte at a high concentration, and that can be discharged by an inkjet method.

According to the present disclosure, it is possible to provide a liquid composition that can inhibit emission of hydrogen sulfide and improve the dispersibility of an inorganic solid electrolyte even when it contains the inorganic solid electrolyte at a high concentration, and that can be discharged by an inkjet method.

As described above, in terms of productivity, wet processes are preferred as the production process for solid electrolyte layers of all-solid-state batteries. However, inorganic solid electrolytes, particularly, sulfide solid electrolytes containing elemental sulfur react not only with water but with organic solvents and emit harmful hydrogen sulfide. Therefore, there has been a limitation to the solvents that are suitable for use in the wet coating processes.

From the viewpoint of improving production efficiency when forming solid electrolyte layers, one may consider preparing a slurry that contains an inorganic solid electrolyte at a high solid concentration. However, in liquid compositions containing high concentrations of an inorganic solid electrolyte, flocculation of the inorganic solid electrolyte tends to occur, or the liquid compositions are very thick.

Existing techniques have made various studies as described above, but have barely succeeded in inhibiting flocculation, maintaining dispersibility, and exhibiting inkjet discharging performance even when the concentration of the inorganic solid electrolyte (hereinafter, may be referred to as an "ion-conductive material") is high.

There is another problem. Some solvents, with which inks are inkjet-dischargeable, however cause inks to dry and clog the discharging unit when inks are discharged again after they are once stopped from being discharged.

The present inventors have found that a liquid composition containing a solvent, an inorganic solid electrolyte, and a dispersant can qualify as a liquid composition that can be discharged by an inkjet method, when the liquid composition contains as the solvent, at least one selected from the group consisting of (I) aliphatic hydrocarbons, (II) monoethers, and (III) branched esters that have a vapor pressure of 0.1 hPa or higher and 1.0 hPa or lower at 25° C., in order that the liquid composition can inhibit emission of hydrogen sulfide and flocculation of the inorganic solid electrolyte and can have an improved dispersibility even if the liquid composition contains the inorganic solid electrolyte at a high concentration.

In the present specification, a liquid composition that can be discharged by an inkjet method represents one that can be continuously discharged for 60 seconds or longer through one nozzle (having a nozzle diameter of 40 μm) of an inkjet head of a liquid droplet observation instrument EV1000 (available from Ricoh Company, Ltd.). When it is said that a liquid composition can be continuously discharged for 60 seconds or longer, the amount of the liquid composition discharged is no object so long as the liquid composition is kept discharged at least 60 seconds after it starts to be discharged. That is, so long as the liquid composition can be continuously discharged for at least 60 seconds from the start of being discharged, the amount of the liquid composition discharged may change or need not necessarily change through the period of time from the start of discharging until 60 seconds after the start of discharging.

In the present specification, a liquid composition that can be discharged again by an inkjet method represents one that can succeed in being discharged again when the liquid composition is discharged again after the liquid composition is once discharged through one nozzle (having a nozzle diameter of 40 μm) of an inkjet head of a liquid droplet observation instrument EV1000 (available from Ricoh Company, Ltd.), kept in the discharged state for 60 seconds, and subsequently left in a stationary state for 5 minutes.

<Solvent>

The solvent of the first embodiment and the second embodiment is not particularly limited and may be appropriately selected in accordance with the intended purpose. It is preferable that the solvent be at least one selected from the group consisting of (I) aliphatic hydrocarbons, (II) monoethers, and (III) branched esters, wherein (I) aliphatic hydrocarbons, (II) monoethers, and (III) branched esters have a vapor pressure of 0.1 hPa or higher and 1.0 hPa or lower at 25° C.

The solvent of the third embodiment and the fourth embodiment is at least one selected from the group consisting of (I) aliphatic hydrocarbons, (II) monoethers, and (III) branched esters, wherein I) aliphatic hydrocarbons, (II) monoethers, and (III) branched esters have a vapor pressure of 0.1 hPa or higher and 1.0 hPa or lower at 25° C.

A liquid composition containing a solvent having a vapor pressure of 0.1 hPa or higher and 1.0 hPa or lower at 25° C. has a sufficiently low transpirability. Therefore, occurrence of clogging of a discharging port due to drying of the liquid composition during inkjet discharging can be inhibited. When a liquid composition is produced using at least one selected from the group consisting of (I) aliphatic hydrocarbons, (II) monoethers, and (III) branched esters, occurrence of deterioration of the inorganic solid electrolyte can be inhibited, and occurrence of flocculation of particles can be inhibited with a high dispersibility.

One, or two or more of solvents having a vapor pressure of 0.1 hPa or higher and 1.0 hPa or lower at 25° C. may be used alone or in combination. When a mixed solvent in which two or more solvents are combined is used, each solvent is evaluated as to whether the vapor pressure at 25° C. is 0.1 hPa or higher and 1.0 hPa or lower.

For the vapor pressure of solvents at 25° C., Safety Data Sheet (SDS) of the solvents may be consulted, if the vapor pressure concerned is written in the SDS. For solvents, of which vapor pressure at 25° C. is not written in their SDS, the vapor pressure at 25° C. may be measured according to the isoteniscope method written in Environment Agency, Environmental Health Department, Office of Health Studies, *Studies into Physicochemical Characterization of Chemical Substances*, Japan Environment Association, 1986.

The vapor pressure of the solvent at 25° C. is not particularly limited, may be appropriately selected in accordance with the intended purpose, and is preferably 0.1 hPa or higher and 1.0 hPa or lower, and in terms of preventing drying, more preferably 0.1 hPa or higher and 0.5 hPa or lower.

[(I) Aliphatic Hydrocarbon]

(I) represents a solvent having an aliphatic hydrocarbon structure. Structurally, an aliphatic hydrocarbon has a sufficiently low reactivity with a sulfide solid electrolyte. Therefore, an aliphatic hydrocarbon has a scarce effect on ion conductivity after coating.

The aliphatic hydrocarbon may have a branched chain or need not necessarily have a branched chain.

The number of carbon atoms in the (I) aliphatic hydrocarbon is not particularly limited, may be appropriately selected in accordance with the intended purpose, and is preferably in the range of from 11 through 14. When the number of carbon atoms is in the preferable range, it is possible to inhibit occurrence of clogging of a head due to drying during inkjet coating, and to also inhibit occurrence of clogging in an inkjet step because the solvent viscosity is not high.

Preferable examples of the (I) aliphatic hydrocarbon include undecane, dodecane, tridecane, tetradecane, cycloundecane, cyclododecane, cyclotridecane, cyclotetradecane, and 2-butyl octane. Undecane, tridecane, tetradecane, and 2-butyl octane are more preferable.

[(II) Monoether]

(II) represents a solvent having a monoether structure. Diether structures and higher ether structures have a high reactivity with sulfide solid electrolytes, and it may not be possible to obtain a stable ink with these solvents.

The number of molecules that constitute the basic skeleton of the (II) monoether is not particularly limited, may be appropriately selected in accordance with the intended purpose, and is preferably in the range of from 11 through 13. When the number of molecules is in the preferable range, it is possible to inhibit occurrence of clogging of a head due to drying during inkjet coating, and to suppress consumption of excessive energy in a drying step after ink-jetting because the boiling point of the solvent is not higher than 250° C.

Preferable examples of the (II) monoether include butylphenyl ether, pentyl phenyl ether, hexyl phenyl ether, dipentyl ether, and dihexyl ether. Butylphenyl ether and dihexyl ether are more preferable.

[(III) Branched ester]

(III) represents a solvent having a branched ester structure.

As the (III) branched ester, either of a type-(i) ester in which a hydrocarbon group containing 2 or less carbon atoms is bonded to the carbon side of the ester group and a branched hydrocarbon group is bonded to the oxygen side of the ester group, and a type-(ii) ester in which a hydrocarbon group containing 3 or less carbon atoms is bonded to the oxygen side of the ester group and a branched hydrocarbon group is bonded to the carbon side of the ester group is preferable.

The type-(i) ester contains a hydrocarbon group containing 2 or less carbon atoms (i.e., a methyl group or an ethyl group) as the group bonded to carbon of the ester group. Because such an ester has a small compound size and can moderate the viscosity to a sufficiently low level, it is possible to obtain a good inkjet dischargeability. Moreover, the type-(i) ester contains a branched group as the group bonded to oxygen of the ester group. Because such an ester group, of which reactivity is moderated by steric hindrance, does not react with an inorganic solid electrolyte, it is possible to provide a stable solid electrolyte film.

In the type-(i) ester, a branched hydrocarbon group containing 3 or more carbon atoms is preferable as the group bonded to oxygen of the ester group.

The type-(ii) ester contains a hydrocarbon group containing 3 or less carbon atoms as the group bonded to oxygen of the ester group. Because such an ester has a small compound size and can moderate the viscosity to a sufficiently low level, it is possible to obtain a good inkjet dischargeability. Moreover, the type-(ii) ester contains a branched group as the group bonded to carbon of the ester group. Because such an ester group, of which reactivity is moderated by steric hindrance, does not react with an inorganic solid electrolyte, it is possible to provide a stable solid electrolyte film.

The carbon side of the ester group (or the group bonded to carbon of the ester group) represents "R" in Formula (A) below. The oxygen side of the ester group (or the group bonded to oxygen of the ester group) represents "R'" in Formula (A) below.

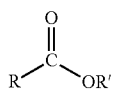

Formula (A)

Preferable examples of the (III) branched ester include isooctyl acetate, 2-ethylhexyl acetate, 2-nonyl acetate, and 2-ethylhexyl propionate. 2-Nonyl acetate, 2-ethylhexyl acetate, and 2-ethylhexyl propionate are more preferable.

As the solvent, one of, or a mixture of two or more of solvents having the structures selected from the group consisting of (I), (II), and (III) above may be used.

The ratio by mass between two or more solvents used in combination is not particularly limited and may be appropriately selected in accordance with the intended purpose.

As the solvents of the first to fourth embodiments, a solvent having a relative permittivity of 6.0 or lower at 25° C. is preferable. When the solvent is a preferable one, there is an advantage that the inorganic solid electrolyte can have a high dispersibility in the solvent regardless of whether the inorganic solid electrolyte is an inorganic solid electrolyte containing elemental sulfur or an inorganic solid electrolyte containing elemental oxygen. When a preferable solvent is used in combination with an inorganic solid electrolyte containing elemental sulfur, there is an advantage that a reaction between a solvent and an inorganic solid electrolyte containing elemental sulfur is less likely to occur, making it possible to inhibit emission of harmful hydrogen sulfide. One preferable solvent may be used alone or two or more preferable solvents may be used in combination. When using a mixed solvent in which two or more solvents are combined, it is preferable that the relative permittivity of the mixed solvent be 6.0 or lower.

The method for measuring the relative permittivity of the solvent is not particularly limited and may be appropriately selected in accordance with the intended purpose. For example, the relative permittivity of the solvent may be measured with MODEL 871 (available from Sanyo Trading Co., Ltd.) at 10 kHz according to a current measurement method using a double cylindrical tube.

Specific examples of the solvent having a relative permittivity of 6.0 or lower at 25° C. include pentane, isopentane, hexane, heptane, 2,2-dimethyl butane, octane, cyclohexane, tetradecane, 1,4-dioxane, benzene, xylene, carbon tetrachloride, mesitylene, toluene, dibutyl ether, anisole, 1,2-diethoxyethane, 2-methyl anisole, 3-methyl anisole, 4-methyl anisole, 1,2-methoxybenzene, 1,3-methoxybenzene, p-ethyl aniline, 4-octanol, phenetole, 2-ethylhexyl acetate, butylphenyl ether, isopropyl benzene, 1,2,3,4-tetrahydronaphthalene, ethyl decanoate, isobutyl acetate, diisopentyl ether, tridecane, cyclooctane, and ethyl propionate.

As the solvent, a dehydrated one is preferable. The degree of dehydration is not particularly limited and may be appropriately selected in accordance with the intended purpose. A water content of the solvent measured with a Karl Fischer moisture titrator is preferably 1,000 ppm or less, more preferably 100 ppm or less, and yet more preferably 10 ppm or less.

<Inorganic Solid Electrolyte>

The inorganic solid electrolyte of the first embodiment to the fourth embodiment is not particularly limited so long as the inorganic solid electrolyte is free of electron conductivity and has ion conductivity. Among inorganic solid electrolytes, sulfide solid electrolytes containing elemental sulfur in the composition formula, or oxide solid electrolytes containing elemental oxygen as the anion are preferable in terms of ion conductivity, and sulfide solid electrolytes are preferred because of their high plasticity that enables formation of a good interface between solid electrolyte particles or between the solid electrolyte and an active substance. As needed, one such inorganic solid electrolyte may be used, or two or more such inorganic solid electrolytes may be used.

—Sulfide Solid Electrolytes—

As the sulfide inorganic solid electrolytes, compounds that contain a sulfur atom (S), have conductivity of ions of metals belonging to Group I or II of the periodic table, and have an electron insulating property are preferable.

The sulfide solid electrolytes are roughly classified into crystalline sulfide solid electrolytes and glassy solid electrolytes.

The crystalline sulfide solid electrolytes are not particularly limited and may be appropriately selected in accordance with the intended purpose. Examples of the crystalline sulfide solid electrolytes include $Li_{9.54}Si_{1.74}P_{1.44}S_{11.7}Cl_{0.3}$, $Li_{9.6}P_3S_{12}$, $Li_9P_3S_9O_3$, $Li_{9.81}Sn_{0.81}P_{2.19}S_{12}$, $Li_{9.42}Si_{1.02}P_{2.1}S_{9.96}O_{2.04}$, $Li_{10}Ge(P_{1-x}Sb_x)_2S_{12}$ ($0 \leq x \leq 0.15$), $Li_{10}SnP_2S_{12}$, $Li_{10.35}[(M1_{1-x}M2_x]_{1.35}P_{1.65}S_{12}$ (where M1 and M2 represent any of Si, Ge, Sn, As, and Sb, $0 \leq x \leq 0.15$), $Li_{11}Si_2PS_{12}$, $Li_{11}AlP_2S_{12}$, $Li_{3.45}Si_{0.45}P_{0.55}S_4$, $Li_6PS_5X$ (where X represents any of Cl, Br, and I), $Li_5PS_4X_2$ (where X represents any of Cl, Br, and I), $Li_{5.5}PS_{4.5}Cl_{1.5}$, $Li_{5.35}CaG_{0.1}PS_{4.5}Cl_{1.55}$, $Li_{6+x}M_xSb_{1-x}S_5I$ (where M represents any of Si, Ge, and Sn, $0 \leq x \leq 1$), $Li_7P_2S_8I$, $\gamma-Li_3PS_4$, $Li_4MS_4$ (where M represents any of Ge, Sn, and As), $Li_{4-x}Sn_{1-x}Sb_xS_4$ ($0 \leq x \leq 0.15$), $Li_{4-x}Ge_{1-x}P_xS_4$ ($0 \leq x \leq 0.15$), and $Li_{3+5x}P_{1-x}S_4$ ($0 \leq x \leq 0.3$).

The glassy sulfide solid electrolytes are not particularly limited and may be appropriately selected in accordance with the intended purpose. Examples of the glassy sulfide solid electrolytes include $Li_2S$—$P_2S_5$, $Li_2S$—$P_2S_5$—LiI, $Li_2S$—$P_2S_5$—$P_2O_5$, $Li_2S$—$P_2S_5$—LiCl, $Li_2S$—$SiS_2$, $Li_2S$—$SiS_2$—$P_2S_5$, $Li_2S$—$SiS_2$—$Al_2S_3$, $Li_2S$—$SiS_2$—$Li_xMO_y$ (where M represents any of Si, P, and Ge). In addition, for example, $Li_7P_3S_{11}$ glass ceramic, which is a partly crystallized glassy sulfide solid electrolyte, may also be used. There is no specific requisite mix ratio between the materials of the glassy sulfide solid electrolyte.

—Oxide Solid Electrolyte—

As the oxide inorganic solid electrolytes, any compounds that contain elemental oxygen (O), have conductivity of ions of metals belonging to Group I or II of the periodic table, and have an electron insulating property are preferable.

The oxide solid electrolytes are roughly classified into crystalline oxide solid electrolytes and glassy oxide solid electrolytes.

The crystalline oxide solid electrolytes are not particularly limited and may be appropriately selected in accordance with the intended purpose. Examples of the crystalline oxide solid electrolytes include $Li_{1+x}M_xTi_{2-x}(PO_4)_3$ (where M represents any of Al, Cr, Ga, Fe, Sc, In, Lu, Y, and La, $0 \leq x \leq 0.5$), $La_xLi_yTiO_3$ ($0.3 \leq x \leq 0.7$, $0.3 \leq y \leq 0.7$), and $Li_{7-x}La_3Zr_{2-x}M_xO_{12}$ (where M represents Nb or Ta, $0 \leq x \leq 1$).

The glassy oxide solid electrolytes are not particularly limited and may be appropriately selected in accordance with the intended purpose. Examples of the glassy oxide solid electrolytes include $Li_4SiO_4$—$Li_2BO_3$, $Li_3BO_3$—$Li_2SO_4$, $Li_2O$—$B_2O_3$—$P_2O_5$, and $Li_2O$—$SiO_2$.

As the inorganic solid electrolyte, a product prepared by a publicly-known method or a commercially available product may be used.

The content of the inorganic solid electrolyte in the liquid composition is not particularly limited and may be appropriately selected in accordance with the intended purpose.

The solid concentration of the inorganic solid electrolyte is preferably 10% by mass or higher, more preferably 15% by mass or higher, yet more preferably 20% by mass or higher, and particularly preferably 30, by mass or higher. The upper limit is not particularly limited, may be appropriately selected in accordance with the intended purpose, and is preferably 60, by mass or lower. When the content of the inorganic solid electrolyte is in the preferable range specified above, there is an advantage that a better productivity is obtained.

<Dispersant>

The dispersant of the first embodiment and the second embodiment is not particularly limited so long as the dispersant is soluble in the solvent, does not readily react with the inorganic solid electrolyte, and can disperse the inorganic solid electrolyte. Publicly-known dispersants or commercially available dispersants may be appropriately selected in accordance with the intended purpose. One dispersant may be used alone or two or more dispersants may be used in combination.

The dispersant of the third embodiment and the fourth embodiment is not particularly limited so long as the dispersant does not readily react with the inorganic solid electrolyte and can disperse the inorganic solid electrolyte. Publicly-known dispersants or commercially available dispersants may be appropriately selected in accordance with the intended purpose. One dispersant may be used alone or two or more dispersants may be used in combination.

It is preferable that the dispersant of the third embodiment and the fourth embodiment be soluble in the solvent.

In the present specification, a dispersant soluble in the solvent represents one that is compatible with the solvent. More specifically, the dispersant can be considered dissolved in the solvent when no precipitate or supernatant is observed after the dispersant (3% by mass) is added and dissolved in the solvent, and then left in a stationary state for 10 minutes.

Specific examples of the dispersant include: polyethylene-based, polyethylene oxide-based, polypropylene oxide-based, polycarboxylic acid-based, naphthalene sulfonic acid formalin condensate-based, polyethylene glycol-based, polycarboxylic acid partial alkyl ester-based, polyether-based, polyethyleneimine-based, and polyalkylene polyamine-based high-molecular-weight dispersants; alkyl sulfonic acid-based, quaternary ammonium-based long-chain alcohol alkylene oxide-based, multivalent alcohol ester-based, and alkyl polyamine-based low-molecular-weight dispersants; and inorganic dispersants such as polyphosphoric acid salt dispersants.

The content of the dispersant in the liquid composition is not particularly limited and may be appropriately selected in accordance with the intended purpose. The solid concentration of the dispersant is preferably 10% by mass or lower and more preferably 3% by mass or lower relative to the solid electrolyte dispersed by the dispersant. When the content of the dispersant is outside the preferable range specified above, there is a risk of flocculation due to the high dispersant concentration.

<Other Components>

The other components in the liquid composition according to the first to fourth embodiments are not particularly limited and may be appropriately selected in accordance with the intended purpose so long as the effect of the present disclosure is not spoiled. Examples of the other components include publicly-known components used in solid electrolyte layers or electrode mixture layers. Specific examples of the other components include binders, active substances, and conductive assistants. One of these other components may be used alone or two or more of these other components may be used in combination.

The contents of the other components in the liquid composition are not particularly limited and may be appropriately selected in accordance with the intended purpose.

—Binder—

The binder is not particularly limited and may be appropriately selected in accordance with the intended purpose so long as the binder can bind inorganic solid electrolytes with each other, or inorganic solid electrolytes with a base or an electrode active substance. Examples of the binder include high-molecular-weight compounds and high-molecular-weight particles. One binder may be used alone or two or more binders may be used in combination.

The high-molecular-weight compound is not particularly limited and may be appropriately selected in accordance with the intended purpose. Examples of the high-molecular-weight compound include polyamide compounds, polyimide compounds, polyamide imide, ethylene-propylene-butadiene rubbers (EPBR), styrene-butadiene rubbers (SBR), nitrile butadiene rubbers (NBR), isoprene rubbers, polyisobutene, polyethylene glycol (PEO), polymethyl methacrylic acid (PMMA), and polyethylene vinyl acetate (PEVA).

High-molecular-weight particles may be used as a high-molecular-weight compound that can be dispersed in a liquid. The maximum particle diameter of the high-molecular-weight particles may be anything so long as it is smaller than the nozzle diameter of a liquid discharging head. The mode diameter of the high-molecular-weight particles is preferably from 0.01 μm through 1 μm. Examples of the material that constitute the high-molecular-weight particles include thermoplastic resins such as polyvinylidene fluoride, acrylic resins, styrene-butadiene rubbers, polyethylene, polypropylene, polyurethane, nylon, polytetrafluoroethylene, polyphenylene sulfide, polyethylene terephthalate, and polybutylene terephthalate.

—Active Substance—

As the active substance, positive electrode active substances or negative electrode active substances that can be applied to electrochemical elements can be used.

The positive electrode active substance is not particularly limited so long as the positive electrode active substance can occlude and release alkali metal ions reversibly. Alkali metal-containing transition metal compounds can be used as the positive electrode active substance.

Examples of the alkali metal-containing transition metal compound include lithium-containing transition metal compounds such as composite oxides containing lithium and one or more elements selected from the group consisting of cobalt, manganese, nickel, chromium, iron, and vanadium.

Examples of the lithium-containing transition metal compounds include lithium cobaltate, lithium nickelate, lithium manganate, and nickel-cobalt lithium manganate.

As the alkali metal-containing transition metal compound, polyanion-based compounds that contain an $XO_4$ tetrahedron (for example, X=P, S, As, Mo, W, or Si) in the crystalline structure can also be used. Among these polyanion-based compounds, lithium-containing transition metal phosphoric acid compounds such as lithium iron phosphate and lithium vanadium phosphate are preferable in terms of cycle characteristics, and lithium vanadium phosphate is particularly preferable in terms of the coefficient of lithium diffusion and the input/output characteristics of electrochemical elements.

In terms of electron conductivity, it is preferable that the polyanion-based compound be a composite material with its surface coated with a conductive assistant such as a carbon material.

The negative electrode active substance is not particularly limited so long as the negative electrode active substance can occlude and release alkali metal ions reversibly. Carbon materials containing graphite having a graphitic crystalline structure can be used as the negative electrode active substance.

Examples of the carbon materials include natural graphite, artificial graphite, sparingly graphitizable carbon (hard carbon), and easily graphitizable carbon (soft carbon).

Examples of the carbon materials include natural graphite, artificial graphite, sparingly graphitizable carbon (hard carbon), and easily graphitizable carbon (soft carbon).

In terms of the energy density of electrochemical elements, it is preferable to use high-capacity materials such as lithium metal, silicon, tin, silicon alloys, tin alloys, silicon oxide, silicon nitride, and tin oxide as the negative electrode active substance.

The content of the active substance in the liquid composition is not particularly limited, may be appropriately selected in accordance with the intended purpose, and is preferably 10% by mass or greater and more preferably 15% by mass or greater. When the content of the active substance in the liquid composition is 10% by mass or greater, it is possible to form an electrode mixture layer having a predetermined unit weight by a less number of times of printing.

—Conductive Assistant—

The conductive assistant is not particularly limited and may be appropriately selected in accordance with the intended purpose. For example, carbon materials such as conductive carbon black, carbon nanofiber, carbon nanotube, graphene, and graphite particles can be used.

The conductive assistant may be a composite material combined with the active substance.

Conductive carbon black can be produced by, for example, a furnace method, an acetylene method, and a gasification method.

As conductive assistants other than the carbon materials, for example, metal particles and metal fibers of, for example, aluminum can be used.

The amount of the conductive assistant relative to the active substance is not particularly limited, may be appropriately selected in accordance with the intended purpose, and is preferably 10% by mass or less and more preferably 8% by mass or less.

[Particle Diameter and Granularity Distribution]

A 10% volume fraction-component's particle diameter ($D_{10}$), a 50% volume fraction-component's particle diameter ($D_{50}$), a 90% volume fraction-component's particle diameter ($D_{90}$), and a mode diameter ($D_m$) of solids contained in the liquid composition according to the first embodiment and the second embodiment, such as the solid electrolyte and other solid components added as needed satisfy Formulae (1) to (3) below, where $D_{10}$, $D_{50}$, $D_{90}$, and $D_m$ are measured by a laser diffraction method.

It is preferable that a 10% volume fraction-component's particle diameter ($D_{10}$), a 50% volume fraction-component's particle diameter ($D_{50}$), a 90% volume fraction-component's particle diameter ($D_{90}$), and a mode diameter ($D_m$) of solids contained in the liquid composition according to the third embodiment and the fourth embodiment, such as the solid electrolyte and other solid components added as needed satisfy Formulae (1) to (3) below, where $D_{10}$, $D_{50}$, $D_{90}$, and $D_m$ are measured by a laser diffraction method.

When Formulae (1) to (3) below are satisfied, a dry product obtained from the liquid composition has a good ion conductivity.

$$D_{90}/D_{10} > 10 \quad \text{Formula (1)}$$

$$D_{50} < 1 \text{ μm} \quad \text{Formula (2)}$$

$$D_m < 2 \text{ μm} \quad \text{Formula (3)}$$

The value $D_{90}/D_{10}$ is not particularly limited, may be appropriately selected in accordance with the intended purpose, and is preferably greater than 10, and for a better ion conductivity, more preferably 15 or greater and yet more preferably 20 or greater.

The value $D_{10}$ is not particularly limited, may be appropriately selected in accordance with the intended purpose, and is preferably a value that satisfies Formula (1) above, and for a good ion conductivity, more preferably 1 μm or less, and yet more preferably 0.5 μm or less. The lower limit of the value $D_{10}$ is not particularly limited, may be appropriately selected in accordance with the intended purpose, and is preferably 0.05 μm or greater.

The value $D_{90}$ is not particularly limited, may be appropriately selected in accordance with the intended purpose, and is preferably a value that satisfies Formula (1) above, and for a good ion conductivity, more preferably 2 μm or greater and yet more preferably 4 μm or greater. The upper limit of the value $D_{90}$ is not particularly limited, may be appropriately selected in accordance with the intended purpose, and is preferably 10 μm or less.

The value $D_{50}$ is not particularly limited, may be appropriately selected in accordance with the intended purpose, and is preferably a value that satisfies Formula (2) above, and for a better ion conductivity, more preferably 1.0 μm or less. The lower limit of the value $D_{50}$ is not particularly limited, may be appropriately selected in accordance with the intended purpose, and is preferably 0.5 μm or greater.

The value $D_m$ is not particularly limited may be appropriately selected in accordance with the intended purpose, and is preferably a value that satisfies Formula (3) above, and for a better ion conductivity, more preferably 2 μm or less and yet more preferably 1.5 μm or less. The lower limit of the value $D_m$ is not particularly limited, may be appropriately selected in accordance with the intended purpose, and is preferably 0.5 μm or greater.

[Maximum Particle Diameter]

The maximum particle diameter of the solids contained in the liquid composition according to the first to fourth embodiments is not particularly limited and may be appropriately selected in accordance with the intended purpose so long as the effect of the present disclosure is not spoiled. It is preferable that the maximum particle diameter of the solids be smaller than the nozzle diameter of an inkjet head. It is preferable that the maximum particle diameter of the solids be sufficiently smaller than the nozzle diameter of an inkjet head because a better inkjet dischargeability is obtained. Specifically, the ratio of the maximum particle diameter of the solids contained in the liquid composition to the nozzle diameter of an inkjet head (the maximum particle diameter of the solids contained in the liquid composition/the nozzle diameter of an inkjet head) is preferably 0.8 or less, more preferably 0.6 or less, and yet more preferably 0.5 or less. That is, when the nozzle diameter of an inkjet head is assumed to be 40 μm, the maximum particle diameter of the solids contained in the liquid composition is preferably 32 μm or less, more preferably 24 μm or less, and yet more preferably 20 μm or less.

The method for measuring the diameters $D_{10}$, $D_{50}$, $D_{90}$, and $D_m$, and the maximum particle diameter of the solids contained in the liquid composition is not particularly limited and may be appropriately selected in accordance with the intended purpose. For example, the diameters $D_{10}$, $D_{50}$, $D_{90}$, and $D_m$ and the maximum particle diameter of the solids can be measured according to, for example, ISO13320. The instrument used for the measurement is not particularly limited and may be appropriately selected in accordance with the intended purpose. Examples of the instrument include a laser diffraction/scattering particle diameter distribution analyzer (LA-960, available from Horiba, Ltd.).

The method for measuring the maximum particle diameter of a powder component used as a material of the liquid composition is not particularly limited and may be appropriately selected in accordance with the intended purpose. Examples of the method include a method using a laser diffraction method as in the method for measuring the maximum particle diameter of the solids contained in the liquid composition described above, and a method of obtaining the maximum particle diameter of a powder component from an image captured by scanning electron beam diffraction.

[Viscosity]

The viscosity of the liquid composition according to the first to fourth embodiments is not particularly limited and may be appropriately selected in accordance with the intended purpose so long as the effect of the present disclosure is not spoiled, and is preferably a viscosity at which the liquid composition can be discharged from a nozzle of an inkjet head. More specifically, the viscosity of the liquid composition at 25° C. is preferably 200 mPa·s or lower, more preferably 100 mPa·s or lower, yet more preferably 50 mPa·s or lower, and particularly preferably 25 mPa·s or lower. The lower limit is not particularly limited and may be appropriately selected within a viscosity range in which the liquid composition can be discharged by an inkjet method.

The method for measuring the viscosity of the liquid composition is not particularly limited and may be appropriately selected in accordance with the intended purpose. For example, the viscosity can be measured with a B-type viscometer (cone plate viscometer) mounted with a rotor No. CPA-40Z. In the present specification, the viscosity of the liquid composition represents a viscosity at 25° C.

The use of the liquid composition is not particularly limited and may be appropriately selected in accordance with the intended purpose. The liquid composition can be used as the material of a solid electrolyte layer of an all-solid-state secondary battery, or as a part involved in formation of a material of an electrode mixture layer.

(Method for Producing Liquid Composition)

The method for producing the liquid composition is not particularly limited and may be appropriately selected in accordance with the intended purpose. For example, it is possible to produce the liquid composition suitably by a producing method described below.

The method for producing a liquid composition is a method for producing the liquid composition according to the present disclosure described above, includes a dissolving or dispersing step, and further includes other steps as needed.

<Dissolving or Dispersing Step>

The dissolving or dispersing step is a step of dissolving or dispersing an inorganic solid electrolyte and a dispersant in a solvent. For example, it is possible to prepare the liquid composition by adding the inorganic solid electrolyte and the dispersant, and the other components as needed to the solvent, and mixing the resulting product.

The solvent, the inorganic solid electrolyte, and the dispersant are the same as the solvent, the inorganic solid electrolyte, and the dispersant specified in the foregoing section of the liquid composition.

The mixing unit is not particularly limited and may be appropriately selected in accordance with the intended purpose. Examples of the mixing unit include an ultrasonic homogenizer. The mixing conditions are not particularly limited and may be appropriately selected in accordance with the intended purpose.

<Other Steps>

The other steps are not particularly limited and may be appropriately selected in accordance with the intended purpose so long as the effect of the present disclosure is not spoiled. Examples of the other steps include an adjusting step.

—Adjusting Step—

The adjusting step is a step of adjusting the particle diameter of the solids contained in the liquid composition by a mechanical process.

The method for the mechanical process is not particularly limited and may be appropriately selected in accordance with the intended purpose. Examples of the method include a high-speed rotary homogenizer, a wet-type jet mill, a wet-type bead mill, and combinations of two or more of these. The conditions for the mechanical process are not particularly limited and may be appropriately selected in accordance with the intended purpose.

The adjusting step may be performed in the dissolving or dispersing step or after the dissolving or dispersing step.

Through the adjusting step, the solids contained in the liquid composition can satisfy Formula (1) to (3) above. Instead of performing the adjusting step, it may be possible to perform the dissolving or dispersing step by using solids satisfying Formulae (1) to (3) above as the solids contained in the liquid composition.

(Storage Container)

A storage container of the present disclosure is a storage container having stored therein the liquid composition of the present disclosure described above.

The shape, structure, and size of the storage container are not particularly limited and may be appropriately selected in accordance with the intended purpose.

(Apparatus Configured to Produce Solid Electrolyte Layer or Electrode Mixture Layer, and Method for Producing Solid Electrolyte Layer or Electrode Mixture Layer)

An apparatus configured to produce a solid electrolyte layer or an electrode mixture layer of the present disclosure includes the storage container of the present disclosure described above, and a discharging unit configured to discharge the liquid composition stored in the storage container using an inkjet head, and further includes other components as needed.

A method for producing a solid electrolyte layer or an electrode mixture layer of the present disclosure includes a discharging step of discharging the liquid composition of the present disclosure described above using an inkjet head, and further includes other steps as needed.

<Discharging Unit and Discharging Step>

The discharging unit is unit configured to discharge the liquid composition stored in the storage container using an inkjet head.

The discharging step is a step of discharging the liquid composition using an inkjet head.

By the discharging, it is possible to apply the liquid composition to a target and form a liquid composition layer.

The target (hereinafter, may be referred to as a "discharging destination") is not particularly limited and may be appropriately selected in accordance with the intended purpose so long as it is a target on which a solid electrolyte layer or an electrode mixture layer is formed. Examples of the target include an active substance layer.

As described above, it is preferable that the maximum particle diameter of the solids contained in the liquid composition be smaller than the nozzle diameter of an inkjet head. It is also preferable that the ratio of the maximum particle diameter of the solids contained in the liquid composition to the nozzle diameter of an inkjet head be 0.8 or less.

<Other Components and Other Steps>

The other components of the apparatus configured to produce a solid electrolyte layer or an electrode mixture layer are not particularly limited and may be appropriately selected in accordance with the intended purpose so long as the effect of the present disclosure is not spoiled. Examples of the other components include a heating unit.

The other steps of the method for producing a solid electrolyte layer or an electrode mixture layer are not particularly limited and may be appropriately selected in accordance with the intended purpose so long as the effect of the present disclosure is not spoiled. Examples of the other steps include a heating step.

—Heating Unit and Heating Step—

The heating unit is a unit configured to heat the liquid composition discharged by the discharging unit.

The heating step is a step of heating the liquid composition discharged in the discharging step.

By this heating, it is possible to dry the liquid composition layer.

FIG. 1 illustrates an example view of the apparatus configured to produce a solid electrolyte layer or an electrode mixture layer for realizing the method for producing a solid electrolyte layer or an electrode mixture layer according to the present embodiment.

The apparatus configured to produce a solid electrolyte layer or an electrode mixture layer illustrated in FIG. 1 is an apparatus configured to produce a solid electrolyte layer or an electrode mixture layer using the liquid composition described above. The solid electrolyte layer or electrode mixture layer apparatus includes a discharging step unit 10 including a step of applying the liquid composition to a print base material 4 having a discharging destination to form a liquid composition layer, and a heating step unit 30 including a heating step of heating the liquid composition layer to obtain a solid electrolyte layer or an electrode mixture layer. The solid electrolyte layer or electrode mixture layer apparatus includes a conveying unit 5 configured to convey the print base material 4. The conveying unit 5 conveys the print base material 4 to the discharging step unit 10 first and to the heating step unit 30 next at a previously set speed.

The method for producing the print base material 4 having the discharging destination such as the active substance layer mentioned above is not particularly limited, and a publicly-known method may be appropriately selected.

The discharging step unit 10 includes a printer 1a desirably selected to suit to an inkjet printing method, which is an applying method for realizing an applying step of applying the liquid composition to the print base material 4, a storage container 1b storing the liquid composition, and a supplying tube 1c through which the liquid composition stored in the storage container 1b is supplied to the printer 1a.

The storage container 1b stores the liquid composition 7. The discharging step unit 10 discharges the liquid composition 7 from the printer 1a and applies the liquid composition 7 to the print base material 4, to form a liquid composition layer in a thin film shape. The storage container 1b may be a form integrated with the solid electrolyte layer or electrode mixture layer apparatus, or may be a form detachable from the solid electrolyte layer or electrode mixture layer apparatus. Moreover, the storage container 1b may be a container used for adding the liquid composition into the storage container integrated with the solid electrolyte layer or electrode mixture layer apparatus, or into the storage container detachable from the solid electrolyte layer or electrode mixture layer apparatus.

The storage container 1b and the supplying tube 1c may be desirably selected so long as the liquid composition 7 can be stored and supplied stably.

As illustrated in FIG. 1, the heating step unit 30 includes a heater 3a, and includes a solvent removing step of removing the solvent remaining in the liquid composition layer by heating and drying by the heater 3a. As a result, a solid electrolyte layer or an electrode mixture layer can be formed. The heating step unit 30 may perform the solvent removing step at reduced pressure.

The heater 3a is not particularly limited and may be appropriately selected in accordance with the intended purpose. Examples of the heater 3a include substrate heating, an IR heater, and a hot air heater, or combinations of these.

The heating temperature or time may be appropriately selected in accordance with the boiling point of the solvent contained in the liquid composition 7 or the film thickness of the formed film.

Figure 2:
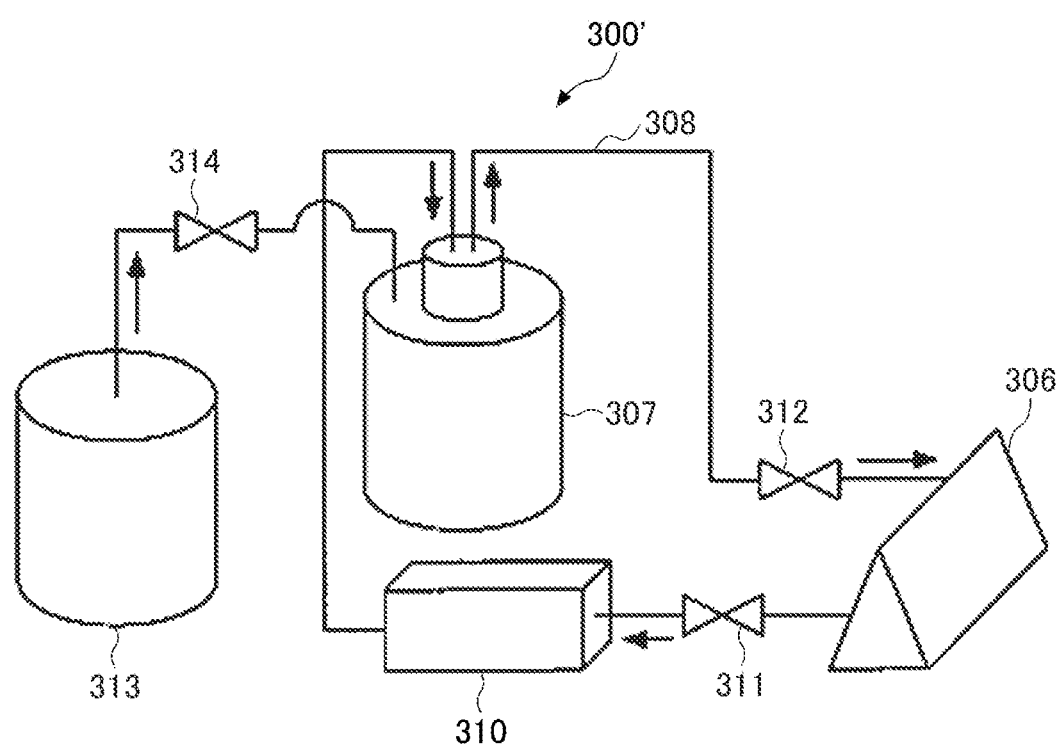
FIG. 2 is an exemplary view illustrating another example of an apparatus (liquid discharging apparatus) configured to produce a solid electrolyte layer or an electrode mixture layer for realizing a method for producing a solid electrolyte layer or an electrode mixture layer of the present disclosure.

FIG. 2 illustrates another example view of the apparatus (liquid discharging apparatus) configured to produce a solid electrolyte layer or an electrode mixture layer for realizing the method for producing a solid electrolyte layer or an electrode mixture layer according to the present embodiment.

A liquid discharging apparatus 300' can circulate the liquid composition through a liquid discharging head 306, a tank 307, and a tube 308 by regulating a pump 310 and valves 311 and 312.

The liquid discharging apparatus 300' includes an external tank 313, and can supply the liquid composition from the external tank 313 into the tank 307 by regulating the pump 310 and the valves 311, 312, and 314 when the liquid composition in the tank 307 has decreased.

Using the apparatus configured to produce a solid electrolyte layer or an electrode mixture layer, it is possible to discharge the liquid composition to the intended position on the discharging destination.

The solid electrolyte layer or the electrode mixture layer can be suitably used as a part of the configuration of, for example, a power storage element. Components other than the solid electrolyte layer or the electrode mixture layer of the power storage element are not particularly limited, and publicly-known components may be appropriately selected. Examples of the other components include a positive electrode, a negative electrode, and a separator.

As the method for producing the power storage element, a publicly-known method may be appropriately selected so long as a solid electrolyte layer or an electrode mixture layer of the method are changed to those of the present disclosure.

The shape of the power storage element is not particularly limited and may be appropriately selected in accordance with the intended purpose. The shape of the power storage element may be not only the shape illustrated in FIG. 3, but may be appropriately selected from various commonly employed shapes in accordance with use of the power storage element. The shape is not particularly limited and may be appropriately selected in accordance with the intended purpose. Examples of the shape include a cylinder type in which a sheet electrode and a solid electrolyte layer are spirally shaped, a cylinder type having an inside-out structure in which a pellet electrode and a solid electrolyte layer are combined, and a coin type in which a pellet electrode and a solid electrolyte layer are laminated.

Figure 3:
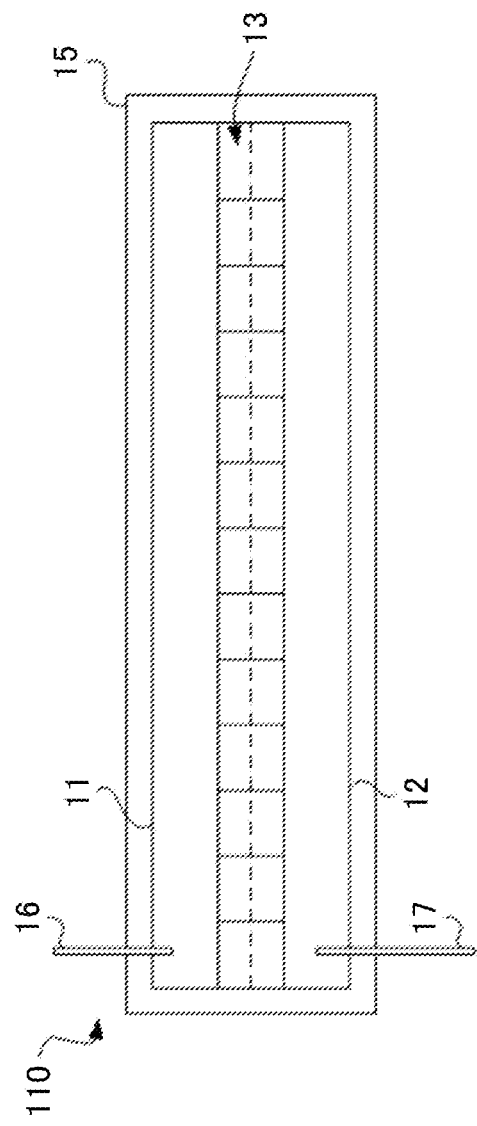
FIG. 3 is an exemplary view illustrating an example of a power storage element including a solid electrolyte layer of the present disclosure.

FIG. 3 illustrates an example view of a power storage element including the solid electrolyte layer according to the present embodiment.

As illustrated in FIG. 3, the power storage element 110 according to the present embodiment includes a positive electrode 11, a negative electrode 12 counter to the positive electrode 11, and a solid electrolyte layer 13 disposed between the positive electrode 11 and the negative electrode 12.

The power storage element 110 includes a container 15 serving as an exterior can that holds the positive electrode 11, the negative electrode 12, and the electrolyte layer 13 by enclosing them, a positive electrode line 16 penetrating the container 15 to couple to the positive electrode 11, and a negative electrode line 17 likewise penetrating the container 15 to couple to the negative electrode 12.

<Use>

The use of the power storage element is not particularly limited, and the power storage element has various uses. Examples of the uses of the power storage element include: power supplies for, for example, laptop personal computers, stylus personal computers, mobile personal computers, electronic book players, portable phones, portable facsimile machines, portable copiers, portable printers, stereo headsets, hand-held video recorders/players, liquid crystal television sets, hand-held cleaners, portable CD players, mini disk players, transceivers, electronic organizers, calculators, memory cards, portable tape recorders, radios, motors, lighting equipment, toys, game consoles, clocks, stroboscopes, and cameras; and backup power supplies.

EXAMPLES

The present disclosure will be described in detail below by way of Examples. The present disclosure should not be construed as being limited to these Examples.

In order to inhibit reaction between an inorganic solid electrolyte and moisture in the air, operations described below were performed in an argon glovebox maintained at a dew point of −70° C. or lower, unless specifically indicated otherwise.

In Preparation examples A1 to A4, Examples A1 and A2, and Comparative Examples A1 to A3 described below, ion conductivity, particle diameter, and granularity distribution were measured in the manners described below.

[Measurement of Ion Conductivity]

First, a powder (30 mg) was placed in a press jig having a diameter of 2.5 mm, and molded into a pellet-shaped sample at a pressure of 10 MPa applied by a uniaxial hydraulic press. A gold powder was further added to the upper and lower surfaces of the pellet-shaped sample and the resulting product was pressed at a pressure of 1 MPa, to form an electrode.

Ion conductivity (S/cm) was calculated in a thermostat chamber at 30° C. according to an alternating current impedance method.

Whether ion conductivity was good or bad was evaluated according to the evaluation criteria described below.

A: Ion conductivity was good (ion conductivity was $1 \times 10^{-4}$ S/cm or higher).

B: Ion conductivity was bad (ion conductivity was lower than $1\times10^{-4}$ S/cm).

[Method for Measuring Particle Diameters and Granularity Distribution]

The diameters $D_{10}$, $D_{50}$, $D_{90}$, and $D_m$, and the maximum particle diameter of the solids contained in a liquid composition were obtained in the manner described below according to ISO13320.

First, using the same solvent as that contained in the liquid composition, the liquid composition was diluted to a solid concentration of from 0.1 ppm through 10 ppm, to obtain a diluted liquid. The diluted liquid was poured into a quartz glass container, which was then sealed with a gasket. Next, the quartz glass container sealed with the gasket was taken out from the glovebox, and the diameters $D_{10}$, $D_{50}$, $D_{90}$, and $D_m$, and the maximum particle diameter were calculated using a laser diffraction/scattering particle diameter distribution analyzer (LA-960, obtained from Horiba, Ltd.). Here, the dilution concentration was adjusted in a manner that the transmissive light intensity of the laser diffraction/scattering particle diameter distribution analyzer was in an appropriate range, using the same solvent as that contained in the liquid composition.

Preparation Examples A1 to A4: Synthesis of Inorganic Solid Electrolytes A1 to A4

As inorganic solid electrolytes A1 to A4, argyrodite-type sulfide solid electrolytes ($Li_6PS_5Cl$) varying in particle diameter were prepared according to Document 1 (Deiseroth H.-J., S.-T. Kong, H. Eckert, J. Vannahme, C. Reiner, T. Zaiss and M. Schlosser, Angew. Chem., International Edition 47, 2008, pp. 755-758).

Ion conductivity of the inorganic solid electrolytes of Preparation examples A1 to A4 was measured in the manner described above. The diameters $D_{10}$, $D_{50}$, $D_{90}$, and $D_m$ of the inorganic solid electrolytes of Preparation examples A1 to A4 were obtained by imaging with a scanning electron microscope (SEM). The results are presented in Table 1.

TABLE 1

|  |  | Inorganic solid electrolyte | $D_{10}$ (μm) | $D_{50}$ (μm) | $D_{90}$ (μm) | $D_m$ (μm) | Ion conductivity (S/cm) |
|---|---|---|---|---|---|---|---|
| Preparation example | A1 | A1 | 0.15 | 0.20 | 1.0 | 0.31 | $1.1 \times 10^{-3}$ |
|  | A2 | A2 | 1.3 | 2.1 | 3.5 | 2.5 | $1.2 \times 10^{-3}$ |
|  | A3 | A3 | 3.3 | 5.6 | 6.1 | 4.5 | $1.5 \times 10^{-3}$ |
|  | A4 | A4 | 1.3 | 5.1 | 12.5 | 1.8 | $1.7 \times 10^{-3}$ |

Examples A1 and A2 and Comparative Examples A1 to A3: Production of Liquid Composition and Dry Powder

[Production of Liquid Composition]

In Examples A1 and A2 and Comparative Examples A1 to A3 below, liquid compositions were produced in the manner described below.

An inorganic solid electrolyte and a dispersant (obtained from Lubrizol Corporation, S21000) were added to a solvent. The inorganic solid electrolyte was added to the solvent in a manner that the content of the inorganic solid electrolyte would be 20% by mass relative to the liquid composition. The dispersant was added at a ratio by mass of 1, by mass relative to the inorganic solid electrolyte.

As the solvent, which was dehydrated, one that was confirmed to have a water content of 100 ppm or less by a Karl Fischer moisture titrator was used.

[Production of Dry Powder]

The obtained liquid composition was dropped into an evaporating dish, and heated for 1 hour on a hot plate kept at 120° C., to obtain a dry powder.

Ion conductivity, particle diameter, and granularity distribution of the liquid compositions of Examples A1 to A2 and Comparative Examples A1 to A3 were measured in the manners described above, and viscosity and inkjet dischargeability of the liquid compositions were evaluated in the manners described below.

[Viscosity of Liquid Composition]

The viscosity of the liquid composition at 100 rpm at 25° C. was measured with a B-type viscometer (cone plate viscometer) mounted with a rotor No. CPA-40Z.

[Inkjet Dischargeability]

Using a liquid droplet observation instrument EV1000 (obtained from Ricoh Company, Ltd.), the inkjet dischargeability of the liquid composition was evaluated in the manner described below.

The liquid composition to be evaluated was discharged from one nozzle (having a nozzle diameter of 40 μm) of the inkjet head of the EV1000. If the liquid composition could be continuously discharged for 60 seconds or longer, it was determined that the liquid composition had dischargeability. With a liquid composition that could be continuously discharged for 60 seconds or longer, the amount of the liquid composition discharged is no object so long as the liquid composition was kept discharged at least 60 seconds after it started to be discharged. That is, so long as the liquid composition could be continuously discharged for at least 60 seconds from the start of being discharged, it does not matter whether the amount of the liquid composition discharged had changed or had not changed through the period of time from the start of discharging until 60 seconds after the start of discharging.

—Evaluation—

A: The liquid composition had dischargeability (could be continuously discharged for 60 seconds or longer).

B: The liquid composition had no dischargeability (could not be continuously discharged for 60 seconds).

Example A1: Liquid Composition a and its Dry Powder

The solid electrolyte A4 and the dispersant were added to octane (having a relative permittivity of 2.1, obtained from Tokyo Chemical Industry Co., Ltd.), and the resulting product was processed with a high-speed rotary homogenizer (obtained from Kinematica AG, MT3100S2) for 1 hour at a rotation number of 30,000 rpm, to produce a liquid composition A.

The diameters $D_{10}$, $D_{50}$, $D_{90}$, and $D_m$, and the maximum particle diameter of the solids contained in the liquid composition A measured by a laser diffraction method were 0.12 μm, 0.8 μm, 2.1 μm, 1.2 μm, and 5.0 μm, respectively.

The viscosity of the obtained liquid composition A was 8 mPa·s.

The ion conductivity of the dry powder obtained from the liquid composition A was $1.0\times10^{-3}$ S/cm.

The inkjet dischargeability of the obtained liquid composition A was evaluated using the EV1000. It was confirmed that the liquid composition A could be continuously discharged for 60 seconds.

Example A2: Liquid Composition B and its Dry Powder

The solid electrolyte A1 (10% by mass), the solid electrolyte A2 (7% by mass), and the solid electrolyte A3 (3% by mass), and the dispersant were added to octane (having a relative permittivity of 2.1, obtained from Tokyo Chemical Industry Co., Ltd.), and the resulting product was processed with an ultrasonic homogenizer (obtained from NIHONSEIKI KAISHA LTD., US-300E) at 500 W for 10 minutes, to produce a liquid composition B.

The diameters $D_{10}$, $D_{50}$, $D_{90}$, and $D_m$, and the maximum particle diameter of the solids contained in the liquid composition B measured by a laser diffraction method were 0.25 μm, 0.9 μm, 5.0 μm, 1.8 μm, and 7.0 μm, respectively.

The viscosity of the obtained liquid composition B was 10 mPa·s.

The ion conductivity of the dry powder obtained from the liquid composition B was $7 \times 10^{-4}$ S/cm.

The inkjet dischargeability of the obtained liquid composition B was evaluated using the EV1000. It was confirmed that the liquid composition B could be continuously discharged for 60 seconds.

Comparative Example A1: Liquid Composition C and its Dry Powder

The solid electrolyte A2 and the dispersant were added to octane (having a relative permittivity of 2.1, obtained from Tokyo Chemical Industry Co., Ltd.), and the resulting product was processed with a high-speed rotary homogenizer (obtained from Kinematica AG, MT3100S2) for 1 hour at a rotation number of 30,000 rpm, to produce a liquid composition C.

The diameters $D_{10}$, $D_{50}$, $D_{90}$, and $D_m$, and the maximum particle diameter of the solids contained in the liquid composition C measured by a laser diffraction method were 0.6 μm, 0.8 μm, 3.0 μm, 1.5 μm, and 4.5 μm, respectively.

The viscosity of the obtained liquid composition C was 10 mPa·s.

The ion conductivity of the dry powder obtained from the liquid composition C was 5-10-5 S/cm.

The inkjet dischargeability of the obtained liquid composition C was evaluated using the EV1000. It was confirmed that the liquid composition C could be continuously discharged for 60 seconds.

Comparative Example A2: Liquid Composition D and its Dry Powder

The solid electrolyte A1 (10% by mass) and the solid electrolyte A3 (10% by mass), and the dispersant were added to octane (having a relative permittivity of 2.1, obtained from Tokyo Chemical Industry Co., Ltd.), and the resulting product was processed with a wet-type jet mill (obtained from SUGINO MACHINE LIMITED, STAR BURST MINIMO) at 180 MPa, to produce a liquid composition D.

The diameters $D_{10}$, $D_{50}$, $D_{90}$, and $D_m$, and the maximum particle diameter of the solids contained in the liquid composition D measured by a laser diffraction method were 0.2 μm, 1.1 μm, 6.5 μm, 1.9 μm, and 16.0 μm, respectively.

The viscosity of the obtained liquid composition D was 8 mPa·s.

The ion conductivity of the dry powder obtained from the liquid composition D was $7 \times 10^{-4}$ S/cm.

The inkjet dischargeability of the obtained liquid composition D was evaluated using the EV1000. The liquid composition D could not be continuously discharged for 60 seconds, and clogging occurred during discharging of the liquid composition D. Accordingly, the performance of the liquid composition D was not acceptable.

Comparative Example A3: Liquid Composition E and its Dry Powder

The solid electrolyte A1 (15% by mass) and the solid electrolyte A4 (5% by mass), and the dispersant were added to octane (having a relative permittivity of 2.1, obtained from Tokyo Chemical Industry Co., Ltd.), and the resulting product was processed with an ultrasonic homogenizer (obtained from NIHONSEIKI KAISHA LTD., US-300E) at 500 W for 10 minutes, to produce a liquid composition E.

The diameters $D_{10}$, $D_{50}$, $D_{90}$, and $D_m$, and the maximum particle diameter of the solids contained in the liquid composition E measured by a laser diffraction method were 0.4 μm, 0.8 μm, 7.0 μm, 3.0 μm, and 19.0 μm, respectively.

The viscosity of the obtained liquid composition E was 11 mPa·s.

The ion conductivity of the dry powder obtained from the liquid composition E was $4 \times 10^{-4}$ S/cm.

The inkjet dischargeability of the obtained liquid composition E was evaluated using the EV1000. The liquid composition E could not be continuously discharged for 60 seconds, and clogging occurred during discharging of the liquid composition E. Accordingly, the performance of the liquid composition E was not acceptable.

The results of Examples A1 and A2 and Comparative Examples A1 to A3 are presented in Table 2 below.

TABLE 2

| | | Liquid composition | Particle diameter, granularity distribution | | | | | Inkjet dischargeability | Ion conductivity |
| | | | $D_{10}$ (μm) | $D_{50}$ (μm) | $D_{90}$ (μm) | $D_m$ (μm) | $D_{90}/D_{10}$ | | |
|---|---|---|---|---|---|---|---|---|---|
| Ex. | A1 | A | 0.12 | 0.8 | 2.1 | 1.2 | 17.5 | A | A |
| | A2 | B | 0.25 | 0.9 | 5.0 | 1.8 | 20.0 | A | A |
| Comp. | A1 | C | 0.6 | 0.8 | 3.0 | 1.5 | 5.0 | A | B |
| Ex. | A2 | D | 0.2 | 1.1 | 6.5 | 1.9 | 32.5 | B | A |
| | A3 | E | 0.4 | 0.8 | 7.0 | 3.0 | 17.5 | B | A |

Preparation Example B1: Synthesis of P23T2 Inorganic Solid Electrolyte B1

As an inorganic solid electrolyte B1, an argyrodite-type sulfide solid electrolyte ($Li_6PS_5Cl$) (LPSC) was synthesized according to Document 2 (Rosero-Navarro Nataly Carolina, et al., *Journal of Power Sources* 396, 2018, pp. 33-40).

Preparation Example B2: Synthesis of Inorganic Solid Electrolyte B2

As an inorganic solid electrolyte B2, $Li_{10}GeP_2S_{12}$ (LGPS) was synthesized according to Document 3 (Kwon Ohmin, Masaaki Hirayama, Kota Suzuki, Yuki Kato, Toshiya Saito, Masao Yonemura, Takashi Kamiyama and Ryoji Kanno, *J. Mater. Chem. A*, 3, 2015, pp. 438-446).

Examples B1 to B11 and Reference Examples B1 to B8: Production of Liquid Composition In Examples B1 to B11 and Reference Examples B1 to B8 below, an inorganic solid electrolyte and a dispersant were added to a dehydrated solvent, and the resulting product was mixed using an ultrasonic homogenizer (US-300E) obtained from NIHONSEIKI KAISHA LTD. at a power output percentage of 70% for 10 minutes, to obtain a liquid composition.

As the dehydrated solvent, one that was confirmed to have a water content of 100 ppm or less by a Karl Fischer moisture titrator was used.

[Evaluation]

The vapor pressure of the solvent used in Examples B1 to B11 and Reference Examples B1 to B8 below at 25° C. was obtained in the manner described below.

For the liquid compositions of Examples B1 to B11 and Reference Examples B1 to B8 below, detection of hydrogen sulfide, inkjet dischargeability, and re-dischargeability after stop were evaluated in the manners described below.

[Vapor Pressure at 25° C.]

For the vapor pressure of each solvent, Safety Data Sheet (SDS) of the solvent was consulted, if the vapor pressure concerned was written in the SDS. For solvents, of which vapor pressure was not written in their SDS, the vapor pressure was measured according to the isoteniscope method written in Document 4 (Environment Agency, Environmental Health Department, Office of Health Studies, *Studies into Physicochemical Characterization of Chemical Substances*, Japan Environment Association, 1986).

[Detection of Hydrogen Sulfide]

Whether hydrogen sulfide was emitted from the mixed liquid composition was judged in the manner described below.

The liquid composition (10 mL) was poured into a screw tube and stored in an argon glovebox at 25° C. for 1 hour. After the storage, a hydrogen sulfide sensor (obtained from Honeywell Japan Ltd., BW SOLO LITE) was brought close to the screw tube and the screw tube was opened. Here, when the hydrogen sulfide sensor kept displaying a value greater than or equal to 0.1 ppm for 3 seconds or longer, it was determined that hydrogen sulfide was emitted.

For safety concerns, any liquid composition that was evaluated as "b" in this test was not evaluated in inkjet dischargeability and re-dischargeability after stop.

—Evaluation— a: Hydrogen sulfide emission was absent.

b: Hydrogen sulfide emission was present.

[Inkjet Dischargeability]

Using a liquid droplet observation instrument EV1000 (obtained from Ricoh Company, Ltd.), the inkjet dischargeability of the liquid composition was evaluated in the manner described below.

The liquid composition to be evaluated was discharged from one nozzle (having a nozzle diameter of 40 μm) of the inkjet head of the EV1000. If the liquid composition could be continuously discharged for 60 seconds or longer, it was determined that the liquid composition had dischargeability. With a liquid composition that could be continuously discharged for 60 seconds or longer, the amount of the liquid composition discharged is no object so long as the liquid composition was kept discharged at least 60 seconds after it started to be discharged. That is, so long as the liquid composition could be continuously discharged for at least 60 seconds from the start of being discharged, it does not matter whether the amount of the liquid composition discharged had changed or had not changed through the period of time from the start of discharging until 60 seconds after the start of discharging.

—Evaluation—

A: The liquid composition had dischargeability (could be continuously discharged for 60 seconds or longer).

B: The liquid composition had no dischargeability (could not be continuously discharged for 60 seconds).

[Re-Dischargeability after Stop]

Using a liquid droplet observation instrument EV1000 (obtained from Ricoh Company, Ltd.), re-dischargeability of the liquid composition after once it was inkjet-discharged was evaluated in the manner described below.

The liquid composition to be evaluated was discharged from one nozzle (having a nozzle diameter of 40 μm) of the inkjet head of the EV1000, kept discharged for 60 seconds, left in a stationary state for 5 minutes, and then re-discharged. If the liquid composition was successfully re-discharged in this re-discharging, it was determined that the liquid composition had re-dischargeability after stop.

—Evaluation—

A: The liquid composition had re-dischargeability.

B: The liquid composition had no re-dischargeability.

Example B1

Undecane (obtained from Tokyo Chemical Industry Co., Ltd.) was weighed out by 40 g as a solvent, to which the inorganic solid electrolyte B1 (56 g) and a dispersant (obtained from Lubrizol Corporation, SOLSPERSE3000 (hereinafter, may be referred to as "S-3000")) (4 g) were added. The resulting product was mixed using an ultrasonic homogenizer, to obtain a liquid composition of Example B1.

Example B2

A liquid composition was produced in the same manner as in Example B1, except that tetradecane (obtained from Tokyo Chemical Industry Co., Ltd.) was used instead of undecane as the solvent, to obtain a liquid composition of Example B2.

Example B3

A liquid composition was produced in the same manner as in Example B1, except that 2-butyloctane (obtained from Tokyo Chemical Industry Co., Ltd.) was used instead of undecane as the solvent, to obtain a liquid composition of Example B3.

Example B4

A liquid composition was produced in the same manner as in Example B1, except that butyl phenyl ether (obtained from Tokyo Chemical Industry Co., Ltd.) was used instead of undecane as the solvent, to obtain a liquid composition of Example B4.

Example B5

A liquid composition was produced in the same manner as in Example B1, except that dihexyl ether (obtained from Tokyo Chemical Industry Co., Ltd.) was used instead of undecane as the solvent, to obtain a liquid composition of Example B5.

Example B6

A liquid composition was produced in the same manner as in Example B1, except that 2-nonyl acetate (obtained from Tokyo Chemical Industry Co., Ltd.) was used instead of undecane as the solvent, to obtain a liquid composition of Example B6.

Example B7

A liquid composition was produced in the same manner as in Example B1, except that 2-ethylhexyl acetate (obtained from Tokyo Chemical Industry Co., Ltd.) was used instead of undecane as the solvent, to obtain a liquid composition of Example B7.

Example B8

A liquid composition was produced in the same manner as in Example B1, except that 2-ethylhexyl propionate (obtained from Tokyo Chemical Industry Co., Ltd.) was used instead of undecane as the solvent, to obtain a liquid composition of Example B8.

Example B9

A liquid composition was produced in the same manner as in Example B1, except that MALIALIM SC-0708A (obtained from NOF Corporation, hereinafter may be referred to as "SC0708A") was used instead of S-3000 as the dispersant, to obtain a liquid composition of Example B9.

Example B10

A liquid composition was produced in the same manner as in Example B1, except that the inorganic solid electrolyte B2 was used instead of the inorganic solid electrolyte B1 as the inorganic solid electrolyte, to obtain a liquid composition of Example B10.

Example B11

A liquid composition was produced in the same manner as in Example B1, except that a mixture of tetradecane and 2-ethylhexyl acetate at a ratio by mass of 1:1 was used instead of undecane as the solvent, to obtain a liquid composition of Example B11.

Reference Example B1

A liquid composition was produced in the same manner as in Example B1, except that n-decane (obtained from Tokyo Chemical Industry Co., Ltd.) was used instead of undecane as the solvent, to obtain a liquid composition of Reference Example B1.

Reference Example B2

A liquid composition was produced in the same manner as in Example B1, except that n-pentadecane (obtained from Tokyo Chemical Industry Co., Ltd.) was used instead of undecane as the solvent, to obtain a liquid composition of Reference Example B2.

Reference Example B3

A liquid composition was produced in the same manner as in Example B1, except that propoxybenzene (obtained from Tokyo Chemical Industry Co., Ltd.) was used instead of undecane as the solvent, to obtain a liquid composition of Reference Example B3.

Reference Example B4

A liquid composition was produced in the same manner as in Example B1, except that diheptyl ether (obtained from Tokyo Chemical Industry Co., Ltd.) was used instead of undecane as the solvent, to obtain a liquid composition of Reference Example B4.

Reference Example B5

A liquid composition was produced in the same manner as in Example B1, except that 1,4-diethoxybenzene (obtained from Tokyo Chemical Industry Co., Ltd.) was used instead of undecane as the solvent, to obtain a liquid composition of Reference Example B5.

Reference Example B6

A liquid composition was produced in the same manner as in Example B1, except that n-octyl acetate (obtained from Tokyo Chemical Industry Co., Ltd.) was used instead of undecane as the solvent, to obtain a liquid composition of Reference Example B6.

Reference Example B7

A liquid composition was produced in the same manner as in Example B1, except that 2-ethylhexyl butyrate (obtained from Tokyo Chemical Industry Co., Ltd.) was used instead of undecane as the solvent, to obtain a liquid composition of Reference Example B7.

Reference Example B8

A liquid composition was produced in the same manner as in Example B1, except that no dispersant was used, to obtain a liquid composition of Reference Example B8.

The evaluation results and other particulars of Examples B1 to B11 and Reference Examples B1 to B8 described above are presented in Tables 3-1 and 3-2 below. In the item "presence or absence of hydrogen sulfide emission" in Tables 3-1 and 3-2, "a" indicates that "hydrogen sulfide emission was absent" and "b" indicates that "hydrogen sulfide emission was present".

TABLE 3-1

| | | Solvent | | | | | Evaluation | | |
|---|---|---|---|---|---|---|---|---|---|
| | Inorganic solid electrolyte | Name | Vapor pressure (hPa) at 25° C. | Structure | Number of C atoms/ Number of molecules/ Number of C atoms on oxygen side- Number of C atoms on carbon side | Dispersant | Presence or absence of hydrogen sulfide emission | Inkjet-dischargeable or not | Re-dischargeable or not after 5-minute stop |
| Ex. B1 | LPSC | Undecane | 0.52 | Alkane | 11 | S-3000 | a | A | A |
| B2 | LPSC | Tetradecane | 0.16 | Alkane | 14 | S-3000 | a | A | A |
| B3 | LPSC | 2-Butyl octane | 0.21 | Alkane | 14 | S-3000 | a | A | A |
| B4 | LPSC | Butylphenyl ether | 0.92 | Monoether | 11 | S-3000 | a | A | A |
| B5 | LPSC | Dihexyl ether | 0.19 | Monoether | 13 | S-3000 | a | A | A |
| B6 | LPSC | 2-Nonyl acetate | 0.63 | Branched ester | 2-9 | S-3000 | a | A | A |
| B7 | LPSC | 2-Ethylhexyl acetate | 0.31 | Branched ester | 2-8 | S-3000 | a | A | A |
| B8 | LPSC | 2-Ethylhexyl propionate | 0.19 | Branched ester | 3-8 | S-3000 | a | A | A |
| B9 | LPSC | Undecane | 0.52 | Alkane | 11 | SC0708A | a | A | A |
| B10 | LGPS | Undecane | 0.52 | Alkane | 11 | S-3000 | a | A | A |
| B11 | LPSC | Tetradecane/2-ethylhexyl acetate | 0.16/ 0.31 | Alkane/ Branched ester | — | S-3000 | a | A | A |

TABLE 3-2

| | | Solvent | | | | | Evaluation | | |
|---|---|---|---|---|---|---|---|---|---|
| | Inorganic solid electrolyte | Name | Vapor pressure (hPa) at 25° C. | Structure | Number of C atoms/ Number of molecules/ Number of C atoms on oxygen side- Number of C atoms on carbon side | Dispersant | Presence or absence of hydrogen sulfide emission | Inkjet-dischargeable or not | Re-dischargeable or not after 5-minute stop |
| Ref. Ex. B1 | LPSC | n-Decane | 1.70 | Alkane | 10 | S-3000 | a | A | B |
| B2 | LPSC | n-Pentadecane | 0.05 | Alkane | 15 | S-3000 | a | B | — |
| B3 | LPSC | Propoxy benzene | 1.55 | Monoether | 10 | S-3000 | a | A | B |
| B4 | LPSC | Diheptyl ether | 0.07 | Monoether | 15 | S-3000 | a | B | — |
| B5 | LPSC | 1,4-Diethoxy benzene | 0.33 | Diether | 12 | S-3000 | b | — | — |
| B6 | LPSC | n-Octyl acetate | 0.56 | Unbranched ester | 2-8 | S-3000 | b | — | — |
| B7 | LPSC | 2-Ethylhexyl butyrate | 0.09 | Branched ester | 4-8 | S-3000 | a | B | — |
| B8 | LPSC | Undecane | 0.52 | Alkane | 11 | — | a | B | — |

The results of Examples B1, B2, and B3, and Reference Examples B1 and B2 in which solvents having an aliphatic hydrocarbon structure were used revealed the followings. When undecane (Example B1) and tetradecane (Example B2) having a vapor pressure of 0.1 hPa or higher and 1.0 hPa or lower were used, hydrogen sulfide was not detected, inkjet dischargeability was good, and re-dischargeability after stop was also good. As compared with this, when n-decane (Reference Example B1) having a vapor pressure higher than 1.0 hPa was used, the inkjet discharging port was clogged in re-discharging after stop, because drying at the inkjet discharging port was accelerated. When n-pentadecane (Reference Example B2) having a vapor pressure lower than 0.1 hPa and a high viscosity was used, the liquid composition to which n-pentadecane was added also had a high viscosity and caused clogging in the inkjet dischargeability evaluation. From these results, preferable solvents having an aliphatic hydrocarbon structure were those that had a vapor pressure of 0.1 hPa or higher and 1.0 hPa or lower. When 2-butyl octane (Example B3) was used, the results were good on all evaluation items, and it can be seen that the same effect could also be obtained when a branched aliphatic hydrocarbon was used.

The results of Examples B4 and B5, and Reference Examples B3, B4, and B5 in which solvents having an ether structure were used revealed the followings. When butylphenyl ether (Example B4) and dihexyl ether (Example B5) having a vapor pressure of 0.1 hPa or higher and 1.0 hPa or lower were used, hydrogen sulfide was not detected, inkjet dischargeability was good, and re-dischargeability after stop was also good. As compared with this, when propoxybenzene (Reference Example B3) having a vapor pressure higher than 1.0 hPa was used, the inkjet discharging port was clogged in re-discharging after stop, because drying at the inkjet discharging port was accelerated. When diheptyl ether (Reference Example B4) having a vapor pressure lower than 0.1 hPa and a high viscosity was used, the liquid composition to which diheptyl ether was added also had a high viscosity and caused clogging in the inkjet dischargeability evaluation. From these results, preferable solvents having an ether structure were also those that had a vapor pressure of 0.1 hPa or higher and 1.0 hPa or lower. When 1,4-diethoxybenzene (Reference Example B5) having a diether structure was used, hydrogen sulfide was detected from the liquid composition. Hence, a structure having a plurality of ether groups in the structure turned out to be unsuitable for use because such a structure has a high reactivity with a sulfide solid electrolyte.

Examples B6, B7, and B8, and Reference Examples B6 and B7 in which solvents having an ester structure were used revealed the followings. When 2-nonyl acetate (Example B6) and 2-ethylhexyl acetate (Example B7) having a vapor pressure of 0.1 hPa or higher and 1.0 hPa or lower and branched respectively at the first position and the second position from carbon bonded to the oxygen side of the ester group were used, hydrogen sulfide was not detected, inkjet dischargeability was good, and re-dischargeability after stop was also good. As compared with this, when n-octyl acetate (Reference Example B6) having no branch at carbon bonded to the oxygen side of the ester group was used, hydrogen sulfide was detected from the liquid composition. From these results, esters having no branch at carbon bonded to the oxygen side were found to be unsuitable for use because such esters have a high reactivity with sulfide solid electrolytes. When 2-ethylhexyl butyrate (Reference Example B7) in which a propyl group was bonded to the carbon side of the ester group was used, hydrogen sulfide emission was inhibited, but clogging occurred in inkjet discharging because the liquid composition had a high viscosity due to the solvent's vapor pressure being lower than 0.1 hPa. As compared with this, when 2-ethylhexyl propionate (Example B8) in which an ethyl group was bonded to the carbon side of the ester group was used, no clogging occurred in inkjet discharging because the vapor pressure of the solvent fell within the range of 0.1 hPa or higher and 1.0 hPa or lower. From these results, preferable solvents having an ester structure were found to be those that had a vapor pressure of 0.1 hPa or higher and 1.0 hPa or lower and that had a methyl group or an ethyl group as the group bonded to the carbon side of the ester group.

Example B9 and Reference Example B8 revealed the followings. In Reference Example B8 in which no dispersant was added, clogging occurred in inkjet discharging because flocculation of particles occurred. In Example B9 in which the type of the dispersant was changed from Example B1, a good discharging performance was exhibited as in Example B1. From these results, it should be apparent that it was indispensable to add a dispersant, but on the other hand, that the effect of the present disclosure could be obtained irrespective of the type of the dispersant and with any types of dispersants that had the dispersing effect.

In Example B10 in which the type of the inorganic solid electrolyte was changed from Example B1, a good discharging performance was exhibited as in Example B1. From this result, it should be apparent that the effect of the present disclosure could be obtained irrespective of the type of the solid electrolyte.

In Example B11 in which a mixed solvent was used as the solvent, a good discharging performance was exhibited as in Example B1. From this result, it should be apparent that the effect of the present disclosure could be obtained also when a mixed solvent was used as the solvent.

Aspects of the present disclosure are, for example, as follows.

<1> A liquid composition, including:
a solvent;
an inorganic solid electrolyte; and
a dispersant, wherein
the dispersant is soluble in the solvent, and
a 10% volume fraction-component's particle diameter ($D_{10}$), a 50% volume fraction-component's particle diameter ($D_{50}$), a 90% volume fraction-component's particle diameter ($D_{90}$), and a mode diameter ($D_m$) of solids contained in the liquid composition satisfy Formulae (1) to (3) below, where $D_{10}$, $D_{50}$, $D_{90}$, and $D_m$ are measured by a laser diffraction method, $$D_{90}/D_{10} > 10 \quad \text{Formula (1)}$$

$$D_{50} < 1\ \mu m \quad \text{Formula (2)}$$

$$D_m < 2\ \mu m \quad \text{Formula (3).}$$

<2> A liquid composition, including:
a solvent;
an inorganic solid electrolyte; and
a dispersant, wherein
the solvent is at least one selected from the group consisting of (I) aliphatic hydrocarbons, (II) monoethers, and (III) branched esters, wherein the (I) aliphatic hydrocarbons, the (II) monoethers, and the (III) branched esters have a vapor pressure of 0.1 hPa or higher and 1.0 hPa or lower at 25° C.

<3> The liquid composition according to <1>,
wherein the solvent is at least one selected from the group consisting of (I) aliphatic hydrocarbons, (II) monoethers, and (III) branched esters, wherein the (I) aliphatic hydrocarbons, the (II) monoethers, and the (III) branched esters have a vapor pressure of 0.1 hPa or higher and 1.0 hPa or lower at 25° C.

<4> The liquid composition according to any one of <1> to <3>,
wherein a viscosity of the liquid composition is 200 mPa·s or lower.

<5> The liquid composition according to any one of <1> to <4>,
wherein a maximum particle diameter of the solids contained in the liquid composition is 32 μm or less.

<6> A liquid composition, including:
a solvent;
an inorganic solid electrolyte; and
a dispersant, wherein
the dispersant is soluble in the solvent, a 10% volume fraction-component's particle diameter ($D_{10}$), a 50% volume fraction-component's particle diameter ($D_{50}$), a 90% volume fraction-component's particle diameter ($D_{90}$), and a mode diameter ($D_m$) of solids contained in the liquid composition satisfy Formulae (1) to (3) below, where $D_{10}$, $D_{50}$, $D_{90}$, and $D_m$ are measured by a laser diffraction method, $$D_{90}/D_{10}>10 \qquad \text{Formula (1)}$$

$$D_{50}<1\ \mu m \qquad \text{Formula (2)}$$

$$D_m<2\ \mu m \qquad \text{Formula (3), and}$$

the liquid composition is discharged using an inkjet head.

<7> A liquid composition, including:
a solvent;
an inorganic solid electrolyte; and
a dispersant, wherein
the solvent is at least one selected from the group consisting of (I) aliphatic hydrocarbons, (II) monoethers, and (III) branched esters, wherein the (I) aliphatic hydrocarbons, the (II) monoethers, and the (III) branched esters have a vapor pressure of 0.1 hPa or higher and 1.0 hPa or lower at 25° C., and
the liquid composition is discharged using an inkjet head.

<8> The liquid composition according to <6>,
wherein the solvent is at least one selected from the group consisting of (I) aliphatic hydrocarbons, (II) monoethers, and (III) branched esters, wherein the (I) aliphatic hydrocarbons, the (II) monoethers, and the (III) branched esters have a vapor pressure of 0.1 hPa or higher and 1.0 hPa or lower at 25° C.

<9> The liquid composition according to any one of <6> to <8>,
wherein a viscosity of the liquid composition is a viscosity at which the liquid composition can be discharged from a nozzle of an inkjet head.

<10> The liquid composition according to any one of <6> to <9>,
wherein a maximum particle diameter of the solids contained in the liquid composition is smaller than a nozzle diameter of an inkjet head.

<11> The liquid composition according to any one of <6> to <10>,
wherein a ratio of a maximum particle diameter of the solids contained in the liquid composition to a nozzle diameter of an inkjet head is 0.8 or less.

<12> The liquid composition according to any one of <1> to <11>,
wherein a relative permittivity of the solvent at 25° C. is 6.0 or lower.

<13> The liquid composition according to any one of <1> to <12>,
wherein a solid concentration of the inorganic solid electrolyte in the liquid composition is 15% by mass or higher.

<14> The liquid composition according to any one of <2> to <5> and <7> to <13>,
wherein the (I) aliphatic hydrocarbons are aliphatic hydrocarbons containing from 11 through 14 carbon atoms.

<15> The liquid composition according to any one of <2> to <5> and <7> to <13>,
wherein the (II) monoethers are monoethers having a basic skeleton formed of from 11 through 13 molecules.

<16> The liquid composition according to any one of <2> to <5> and <7> to <13>,
wherein the (III) branched esters are either of:
(i) an ester in which a hydrocarbon group containing 2 or less carbon atoms is bonded to a carbon side of an ester group and a branched hydrocarbon group is bonded to an oxygen side of the ester group; and
(ii) an ester in which a hydrocarbon group containing 3 or less carbon atoms is bonded to an oxygen side of an ester group and a branched hydrocarbon group is bonded to a carbon side of the ester group.

<17> The liquid composition according to any one of <2> to <5> and <7> to <16>,
wherein as the solvent, one of, or a mixture of two or more of solvents having structures selected from the group consisting of the (I) aliphatic hydrocarbons, the (II) monoethers, and the (III) branched esters is used.

<18> A method for producing the liquid composition according to any one of <1> to <17>, the method including
dissolving or dispersing the inorganic solid electrolyte and the dispersant in the solvent.

<19> The method for producing the liquid composition according to <18>, the method further including
adjusting a particle diameter of the solids contained in the liquid composition by a mechanical process.

<20> The method for producing the liquid composition according to <19>,
wherein the mechanical process is performed by a unit selected from a high-speed rotary homogenizer, a wet-type jet mill, a wet-type bead mill, and combinations of two or more of these.

<21> A storage container, including:
the liquid composition according to any one of <1> to <17>, wherein
the liquid composition is stored in the storage container.

<22> An apparatus configured to produce a solid electrolyte layer or an electrode mixture layer, the apparatus including:
the storage container according to <21>; and
a discharging unit configured to discharge the liquid composition stored in the storage container using an inkjet head.

<23> A method for producing a solid electrolyte layer or an electrode mixture layer, the method including:
discharging the liquid composition according to any one of <1> to <17> using an inkjet head.

<24> The method for producing a solid electrolyte layer or an electrode mixture layer according to <23>,
wherein a maximum particle diameter of the solids contained in the liquid composition is smaller than a nozzle diameter of the inkjet head.

<25> The method for producing a solid electrolyte layer or an electrode mixture layer according to <23> or <24>,
wherein a ratio of a maximum particle diameter of the solids contained in the liquid composition to a nozzle diameter of the inkjet head is 0.8 or less.

The liquid composition according to any one of <1> to <17>, the method for producing the liquid composition according to any one of <18> to <20>, the storage container according to <21>, the apparatus configured to produce a solid electrolyte layer or an electrode mixture layer according to <22>, or the method for producing a solid electrolyte layer or an electrode mixture layer according to any one of <23> to <25> can solve the various problems in the related art and achieve the object of the present disclosure.

Further, the present invention is not limited to these embodiments, but various variations and modifications may be made without departing from the scope of the present invention.

What is claimed is:
1. A liquid composition, comprising:
a solvent;
an inorganic solid electrolyte; and
a dispersant, wherein the dispersant is soluble in the solvent, and
a 10% volume fraction-component's particle diameter ($D_{10}$), a 50% volume fraction-component's particle diameter ($D_{50}$), a 90% volume fraction-component' particle diameter ($D_{90}$), and a mode diameter ($D_m$) of solids contained in the liquid composition satisfy Formulae (1) to (3) below, where $D_{10}$, $D_{50}$, $D_{90}$, and $D_m$ are measured by a laser diffraction method, $$D_{90}/D_{10} > 10 \qquad \text{Formula (1)}$$

$$D_{50} < 1 \text{ μm} \qquad \text{Formula (2)}$$

$$D_m < 2 \text{ μm} \qquad \text{Formula (3),}$$

wherein a relative permittivity of the solvent at 25° C. is 6.0 or lower.

2. The liquid composition according to claim 1, wherein the solvent is at least one selected from the group consisting of (I) aliphatic hydrocarbons, (II) monoethers, and (III) branched esters, wherein the (I) aliphatic hydrocarbons, the (II) monoethers, and the (III) branched esters have a vapor pressure of 0.1 hPa or higher and 1.0 hPa or lower at 25° C.

3. The liquid composition according to claim 1, wherein a viscosity of the liquid composition is 200 mPa·s or lower.

4. The liquid composition according to claim 1, wherein a maximum particle diameter of the solids contained in the liquid composition is 32 μm or less.

5. The liquid composition according to claim 1, wherein a solid concentration of the inorganic solid electrolyte in the liquid composition is 15% by mass or higher.

6. The liquid composition according to claim 2, wherein as the solvent, one of, or a mixture of two or more of solvents having structures selected from the group consisting of the (I) aliphatic hydrocarbons, the (II) monoethers, and the (III) branched esters is used.

7. A storage container, comprising:
the liquid composition according to claim 1, wherein the liquid composition is stored in the storage container.

8. An apparatus configured to produce a solid electrolyte layer or an electrode mixture layer, the apparatus comprising:
the storage container according to claim 7; and
a discharging unit configured to discharge the liquid composition stored in the storage container using an inkjet head.

9. A method for producing a solid electrolyte layer or an electrode mixture layer, the method comprising:
discharging the liquid composition according to claim 1 using an inkjet head.

10. The method for producing a solid electrolyte layer or an electrode mixture layer according to claim 9, wherein a maximum particle diameter of the solids contained in the liquid composition is smaller than a nozzle diameter of the inkjet head.

11. The method for producing a solid electrolyte layer or an electrode mixture layer according to claim 9, wherein a ratio of a maximum particle diameter of the solids contained in the liquid composition to a nozzle diameter of the inkjet head is 0.8 or less.

12. A liquid composition, comprising:
a solvent;
an inorganic solid electrolyte; and
a dispersant, wherein
the dispersant is soluble in the solvent, and
a 10% volume fraction-component's particle diameter ($D_{10}$), a 50% volume fraction-component's particle diameter ($D_{50}$), a 90% volume fraction-component's particle diameter ($D_{90}$), and a mode diameter ($D_m$) of solids contained in the liquid composition satisfy Formulae (1) to (3) below, where $D_{10}$, $D_{50}$, $D_{90}$, and $D_m$ are measured by a laser diffraction method, $$D_{90}/D_{10} > 10 \qquad \text{Formula (1)}$$

$$D_{50} < 1 \text{ μm} \qquad \text{Formula (2)}$$

$$D_m < 2 \text{ μm} \qquad \text{Formula (3),}$$

wherein the solvent is at least one selected from the group consisting of (I) aliphatic hydrocarbons, (II) monoethers, and (III) branched esters, wherein the (I) aliphatic hydrocarbons, the (II) monoethers, and the (III) branched esters have a vapor pressure of 0.1 hPa or higher and 1.0 hPa or lower at 25° C., and
wherein the (I) aliphatic hydrocarbons are aliphatic hydrocarbons containing from 11 through 14 carbon atoms.

13. A liquid composition, comprising:
a solvent;
an inorganic solid electrolyte; and
a dispersant, wherein
the dispersant is soluble in the solvent, and
a 10% volume fraction-component's particle diameter ($D_{10}$), a 50% volume fraction-component's particle diameter ($D_{50}$), a 90% volume fraction-component's particle diameter ($D_{90}$), and a mode diameter ($D_m$) of solids contained in the liquid composition satisfy Formulae (1) to (3) below, where $D_{10}$, $D_{50}$, $D_{90}$, and $D_m$ are measured by a laser diffraction method, $$D_{90}/D_{10} > 10 \qquad \text{Formula (1)}$$

$$D_{50} < 1 \text{ μm} \qquad \text{Formula (2)}$$

$$D_m < 2 \text{ μm} \qquad \text{Formula (3),}$$

wherein the solvent is at least one selected from the group consisting of (I) aliphatic hydrocarbons, (II) monoethers, and (III) branched esters, wherein the (I) aliphatic hydrocarbons, the (II) monoethers, and the (III) branched esters have a vapor pressure of 0.1 hPa or higher and 1.0 hPa or lower at 25° C., and
wherein the (II) monoethers are monoethers having a basic skeleton formed of from 11 through 13 molecules.

14. A liquid composition, comprising:
a solvent;
an inorganic solid electrolyte; and
a dispersant, wherein
the dispersant is soluble in the solvent, and
a 10% volume fraction-component's particle diameter ($D_{10}$), a 50% volume fraction-component's particle diameter ($D_{50}$), a 90% volume fraction-component's particle diameter ($D_{90}$), and a mode diameter ($D_m$) of solids contained in the liquid composition satisfy Formulae (1) to (3) below, where $D_{10}$, $D_{50}$, $D_{90}$, and $D_m$ are measured by a laser diffraction method, $$D_{90}/D_{10} > 10 \qquad \text{Formula (1)}$$

$$D_{50} < 1 \text{ μm} \qquad \text{Formula (2)}$$

$$D_m < 2 \text{ μm} \qquad \text{Formula (3),}$$

wherein the solvent is at least one selected from the group consisting of (I) aliphatic hydrocarbons, (II) monoethers, and (III) branched esters, wherein the (I) aliphatic hydrocarbons, the (II) monoethers, and the (III) branched esters have a vapor pressure of 0.1 hPa or higher and 1.0 hPa or lower at 25° C., and wherein the (III) branched esters are either of:
- (i) an ester in which a hydrocarbon group containing 2 or less carbon atoms is bonded to a carbon side of an ester group and a branched hydrocarbon group is bonded to an oxygen side of the ester group; and
- (ii) an ester in which a hydrocarbon group containing 3 or less carbon atoms is bonded to an oxygen side of an ester group and a branched hydrocarbon group is bonded to a carbon side of the ester group.

* * * * *